(12) United States Patent
Huber

(10) Patent No.: US 11,084,357 B2
(45) Date of Patent: Aug. 10, 2021

(54) SUN SHIELD

(71) Applicant: Bayerische Motoren Werke Aktiengesellschaft, Munich (DE)

(72) Inventor: Wolfgang-Andreas Huber, Fuerstenfeldbruck (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 632 days.

(21) Appl. No.: 15/245,256

(22) Filed: Aug. 24, 2016

(65) Prior Publication Data

US 2016/0361980 A1 Dec. 15, 2016

Related U.S. Application Data

(63) Continuation of application No. PCT/EP2015/052140, filed on Feb. 3, 2015.

(30) Foreign Application Priority Data

Feb. 25, 2014 (DE) ..................... 10 2014 203 319.5
Feb. 25, 2014 (DE) ..................... 10 2014 203 320.9
Feb. 25, 2014 (DE) ..................... 10 2014 203 321.7

(51) Int. Cl.
*B60J 3/04* (2006.01)
*B60J 3/02* (2006.01)
(Continued)

(52) U.S. Cl.
CPC ............... *B60J 3/04* (2013.01); *B60J 3/0208* (2013.01); *E06B 9/24* (2013.01); *G02B 5/0278* (2013.01);
(Continued)

(58) Field of Classification Search
CPC ..... B60J 3/00; B60J 3/02; B60J 3/0204; B60J 3/0208; B60J 3/04; B60J 7/003;
(Continued)

(56) References Cited

U.S. PATENT DOCUMENTS 4,874,938 A 10/1989 Chuang
7,690,712 B2 4/2010 Mitsui
(Continued)

FOREIGN PATENT DOCUMENTS

CN 101995662 A 3/2011
CN 102126416 A 7/2011
(Continued)

OTHER PUBLICATIONS

English translation of Chinese-language Office Action issued in counterpart Chinese Application No. 201580010341.X dated May 31, 2017 (Five (5) pages).
(Continued)

*Primary Examiner* — Jie Lei
(74) *Attorney, Agent, or Firm* — Crowell & Moring LLP

(57) ABSTRACT

A method and a corresponding device for providing a glare shield in a vehicle is designed to select a first element from the plurality of elements of the first layer, so that the first element lies on a light trajectory between the source of glare and a first eye of the viewer, the light trajectory between the source of glare and the first eye lies within the viewing direction range of the first element, and a light trajectory between the source of glare and a second eye of the viewer lies outside of the viewing direction range of the first element.

19 Claims, 8 Drawing Sheets

(51) Int. Cl.
*G02B 5/20* (2006.01)
*E06B 9/24* (2006.01)
*G02F 1/01* (2006.01)
*G02B 5/02* (2006.01)

(52) U.S. Cl.
CPC .............. *G02B 5/20* (2013.01); *G02F 1/0121* (2013.01); *E06B 2009/2405* (2013.01); *E06B 2009/2417* (2013.01); *E06B 2009/2447* (2013.01)

(58) Field of Classification Search
CPC .... B60K 35/00; B60K 2350/405; B60R 1/00; B60R 1/08; B60R 1/081; B60R 1/083; B60R 11/0235; B60R 11/0264; B60R 2300/101; B60R 2300/103; B60R 2300/105; B60R 2300/106; B60R 2300/202; B60R 2300/205; B60R 2300/207; B60R 2300/303; B60R 2300/802; B60Q 1/0023; E06B 9/00; E06B 9/24; E06B 2009/2405; E06B 2009/2447; E06B 2009/2417; G02B 2027/0118; G02B 2027/0123; G02B 2027/0138; G02B 2027/014; G02B 2027/0154; G02B 2027/0187; G02B 26/02; G02B 27/0093; G02B 27/01; G02B 27/0101; G02B 5/0278; G02B 5/20; G02F 1/00; G02F 1/01; G02F 1/0121; G02C 7/101; H01J 2229/8918; H01J 29/896
USPC ....... 359/240, 609, 844, 850, 866, 251, 275, 359/601–603, 612–614, 630–632; 345/7; 348/118, 148, 149, 151, 834; 250/203.4, 250/214 AL, 214 D; 280/735; 296/215, 296/220.01, 211, 97.1, 97.2, 97.4, 97.5, 296/97.6, 97.7, 97.8, 96.19, 97.11; 356/139.01, 152.1; 382/103; 396/419; 701/28, 36; 160/DIG. 3, 210
See application file for complete search history.

(56) References Cited

U.S. PATENT DOCUMENTS

| | | |
|---|---|---|
| 2003/0169213 A1 | 9/2003 | Spero |
| 2010/0165099 A1 | 7/2010 | Marchthaler et al. |
| 2011/0084522 A1 | 4/2011 | Mathes et al. |
| 2011/0088324 A1* | 4/2011 | Wessel .................... E06B 9/264 49/70 |
| 2011/0234079 A1* | 9/2011 | Eom ........................ G02B 5/22 313/112 |
| 2012/0126099 A1 | 5/2012 | Tewari et al. |

FOREIGN PATENT DOCUMENTS

| | | | |
|---|---|---|---|
| DE | 199 33 397 A1 | 1/2001 | |
| DE | 19933397 A1 * | 1/2001 | ............... A61F 9/00 |
| DE | 10 2007 009 980 A1 | 12/2007 | |
| DE | 10 2009 049 114 A1 | 4/2011 | |
| DE | 10 2011 084 730 A1 | 4/2013 | |
| DE | 10 2013 006 846 A1 | 12/2013 | |
| DE | 102013006846 A1 * | 12/2013 | ............ B60J 3/0208 |
| GB | 2 161 983 A | 1/1986 | |
| GB | 2 445 365 A | 7/2008 | |

OTHER PUBLICATIONS

International Search Report (PCT/ISA/210) issued in PCT Application No. PCT/EP2015/052140 dated Apr. 15, 2015, with English translation (four (4) pages).
German Search Report issued in counterpart German Application No. DE 10 2014 203 319.5 dated Nov. 5, 2014, with partial English translation (twelve (12) pages).
German Search Report issued in counterpart German Application No. DE 10 2014 203 320.9 dated Nov. 24, 2014, with partial English translation (eleven (11) pages).
German Search Report issued in counterpart German Application No. DE 10 2014 203 321.7 dated Nov. 14, 2014, with partial English translation (eleven (11) pages).

\* cited by examiner

SUN SHIELD

CROSS REFERENCE TO RELATED APPLICATIONS

This application is a continuation of PCT International Application No. PCT/EP2015/052140, filed Feb. 3, 2015, which claims priority under 35 U.S.C. § 119 from German Patent Application No. 10 2014 203 319.5, 10 2014 203 320.9, and 10 2014 203 321.7, filed Feb. 25, 2014, the entire disclosures of which are herein expressly incorporated by reference.

BACKGROUND AND SUMMARY OF THE INVENTION

Embodiments of the invention relate to a method and to a corresponding device for making available a glare shield in a vehicle. The methods and devices described in this application can be applied, in particular for road vehicles, rail vehicles, aircraft and/or watercraft.

Vehicles (in particular land vehicles such as passenger cars or trucks) typically have devices for reducing restriction of a vehicle driver's vision by glare. The driver of the vehicle can, for example, be dazzled at night by the headlights of an oncoming vehicle. In this context, measures such as dipped headlights, formation of a carpet of light, dazzle-free full beam etc. are provided for reducing the dazzling effect of headlights of the vehicles. In order to reduce the dazzling of a driver during the day, vehicles typically have sun shields for protecting against the glare from the sun or from a gleaming sky. Furthermore, what is referred to as green wedge in the upper part of the front windshield of a vehicle can reduce the dazzling effect of the ambient light.

Furthermore, methods and devices have been described which make available an adaptive glare shield by means of transparent surfaces which can be darkened locally (for example in the form of a coating of the windshield of a vehicle). In this context, the position of a driver's eyes and the position of the source of glare are determined on the basis of cameras and the surface which can be darkened is darkened with the result that the source of glare can cast a shadow onto the driver's eyes. The dazzling effect of the source of glare can therefore be reduced without significantly restricting the driver's field of vision.

The use of surfaces which can be darkened locally, in particular surfaces which are attached to the windshield of a vehicle, has the disadvantage that such surfaces have reduced translucency even in the transparent state. This can lead to a situation in which, under certain circumstances, legal regulations relating to the transparency of windshields cannot be complied with. Furthermore, surfaces which can be darkened on a windshield cannot reduce the dazzling effect of a source of glare which is incident laterally on the vehicle.

Furthermore, the described methods and devices for adaptively reducing a source of glare by means of surfaces which can be darkened give rise to visible artifacts which can be perceived as disruptive by a driver.

The present application is concerned with the technical problem of making available a device for reducing the dazzling of a driver, by means of which device the translucency of the windows of a vehicle (in particular of the front windshield) is not adversely affected. Furthermore, the present application is concerned with the technical problem of making available a device for reducing the dazzling of a driver, by means of which light which is incident laterally on the vehicle can also be blanked out. Furthermore, the present application is concerned with the technical problem of making available an adaptive device for reducing the dazzling of a driver, which device does not generate any visible artifacts and/or can be made to follow the movements of a driver precisely.

At least one of the abovementioned problems is achieved in each case by the features of the invention which are specified in the present application.

According to a first aspect of the invention, a glare shield device is configured to selectively block light from a source of glare at least partially for an eye of a viewer, wherein the glare shield device includes at least a first translucent layer having a multiplicity of elements. The translucency of the multiplicity of elements can be changed separately. The elements of the multiplicity of elements each have a viewing direction range. A reduction in the translucency of an element is perceived more strongly when viewing with an eye of the viewer from a direction within the viewing direction range than when viewing from a direction outside the viewing direction range. The glare shield device is furthermore configured to select a first element from a multiplicity of elements of the first layer, with the result that the first element lies on a light trajectory between the source of glare and a first eye of the viewer, the light trajectory lies between the source of glare and the first eye within the viewing direction range of the first element, and a light trajectory between the source of glare and a second eye of the viewer lies outside the viewing direction range of the first element.

In the described glare shield device, in particular light coming from the source of glare can be blanked out or darkened in such a way that the surroundings of the source of glare can continue to be viewed through the glare shield device. In other words, the light coming from the source of glare can be blanked out on a punctiform basis. The glare shield device can be arranged, for example, on a window of a vehicle (for example on a front windshield). Alternatively or additionally, the glare shield device can be arranged on a movable glare shield (similar to a contemporary sun shield). The glare shield device (in particular a surface of the glare shield device which can be darkened) typically has a surface-like propagation of a specific width (horizontal) and a specific depth (vertical) in order to be able to blank out glare sources at various positions.

The glare shield device includes at least a first translucent layer (also referred to as a translucent display) having a multiplicity of elements. An exemplary layer can include an LC (liquid crystal) display. The translucency of the multiplicity of elements can be variable separately and/or independently of one another. In particular, the multiplicity of elements can include a matrix of individually "darkenable" elements.

The elements of the multiplicity of elements each have a viewing direction range. The viewing direction range is typically limited. Exemplary viewing direction ranges include a range of 90° solid angle or less, or 135° solid angle or less. A limited viewing direction range means that a reduction in the translucency of an element is perceived more strongly when viewing with an eye of a viewer from a direction in the viewing direction range than when viewing from a direction outside the viewing direction range. In particular, darkening of an element may be visible only when the element is viewed from a direction within the viewing direction range. When viewing from a direction outside the viewing direction range, the element can continue to be perceived as being translucent (under certain circumstances to a maximum degree). The darkening of the element therefore may not be visible when viewing from a direction outside the viewing direction range.

The glare shield device can be configured to select a first element (or plurality of elements) from the multiplicity of elements of the first layer. The selected element or elements can then be darkened (i.e. the translucency can be reduced). As a result, the light of a source of glare can be at least partially blocked.

The first element can be selected, in particular, in such a way that the first element lies on a light trajectory between the source of glare and a first eye of the viewer, and that the light trajectory lies between the source of glare and the first eye within the viewing direction range of the first element. This makes it possible for the light of the image source to be at least partially blanked out for the first eye.

Furthermore, the first element can be selected in such a way that the light trajectory between the source of glare and a second eye of the viewer lies outside the viewing direction range of the first element. This ensures that darkening (i.e. reduction of the translucency) of the first element is not perceived by the second eye as a "phantom spot". The term phantom spot can be used to refer to a point or mark or a locally limited area which does not conceal a source of glare when viewed from an eye, and is therefore perceived as a disruptive artifact. Phantom spots typically have the property that they are perceived as "semi-transparent" since the object lying behind them is concealed only for one eye, but unimpeded vision is possible with the other eye. The generation of a phantom spot is illustrated, for example, in FIG. 4a.

The use of such a glare shield device therefore makes it possible to make available a glare shield for the first eye without generating any visible artifacts. The first eye can be the right eye, and the second eye can be the left eye of the viewer (or vice versa).

The glare shield device can include a second translucent layer having a further multiplicity of elements. The glare shield device can be configured to select and, if appropriate, darken a second element (or a plurality of elements) from the multiplicity of elements of the second layer. The second element can be selected in such a way that the second element lies on a light trajectory between the source of glare and the second eye of the viewer, and that the light trajectory between the source of glare and the second eye lies within the viewing direction range of the second element. Therefore, by darkening the second element the source of glare from the second eye can be blanked out. Furthermore, the second element can be selected in such a way that a light trajectory between the source of glare and the first eye of the viewer lies outside the viewing direction range of the second element. The darkening of the second element is therefore not visible for the first eye, with the result that the darkening does not result in any visible artifacts.

Therefore, by using a first layer for the first eye and a second layer for the second eye a glare shield can be made available for both eyes of the viewer (for example of the driver of a vehicle) without visible artifacts (in particular phantom spots) being produced in the process.

A viewing direction range can have a direction range boundary or what is referred to as a breakaway edge. The direction range boundary defines the boundary of the viewing direction range with the result that a viewing direction lies on one side of the direction range boundary within the viewing direction range, and with the result that a viewing direction of the other side of the direction boundary range lies outside the viewing direction range. The direction range boundaries of the viewing direction ranges of the second layer can be mirror-symmetrical with respect to the direction range boundaries of the viewing direction ranges of the first layer. The line of symmetry can lie on a center line perpendicular with respect to a connecting line between the viewer's first and second eye. Such an arrangement makes it possible to ensure that the two layers can reliably blank out the source of glare for the respective eye.

The glare shield device can include a multiplicity of layers, each having a multiplicity of elements. The viewing direction ranges of the elements of two different layers of the multiplicity of translucent layers may be different. The glare shield device can be configured to select the first layer from the multiplicity of layers as a function of the viewing direction ranges. In other words, in order to make available, for differently positioned sources of glare, elements which have a viewing direction range by which the source of glare for the first eye can be blanked out without generating an artifact for the second eye, a plurality of layers can be used with elements which have different viewing direction ranges. Depending on the position of the source of glare, it is then possible to select a different layer from which one or more elements can then be darkened.

Alternatively or additionally, the viewing direction ranges of the elements can change along a surface axis (in particular along the width axis) of the first translucent layer. In other words, the elements of one layer can have different viewing direction ranges. By using elements with different viewing direction ranges it is possible to make available, by means of the first layer, an artifact-free glare shield for the first eye for differently positioned sources of glare.

This makes it possible, in particular, to increase the translucency of the glare shield device (in particular of the surface of the glare shield device which is translucent and can be darkened) since the glare shield can be made available by a single layer (per eye).

The glare shield device can therefore include one or more layers having elements (which are translucent and can be darkened) which are configured to at least partially block the light from one or more sources of glare for the first eye by reducing the translucency, with the result that the reduced translucency cannot be perceived substantially by the second eye. Furthermore, the glare shield device can include one or more layers having elements which are configured to at least partially block the light from the one or more sources of glare for the second eye by reducing the translucency, with the result that the reduced translucency cannot be perceived substantially by the first eye. It is therefore possible to make available a light glare shield for both eyes of the viewer.

Furthermore, the glare shield device can include a darkening layer having elements which are configured to at least partially block the light from the one or more sources of glare for the first eye and for the second eye by reducing the translucency. This can be used, in particular, to remove dazzle from an entire region of the viewer's field of vision (for example make available the effect of a "green wedge" or of a completely darkened sun shield).

Furthermore, the darkening layer can be used to make available a darkened (typically black) background for a display for displaying information. In this context, the glare shield device can include one or more self-illuminating display layers. The display layers can be arranged on a rear side (facing a driver or vehicle occupant) of the glare shield device. The glare shield device can be configured to display information on the darkening layer by means of the one or more self-illuminating display layers. In this way, the glare shield device can be efficiently used (also) as a display for displaying information.

According to a second aspect of the invention, which can be considered independently or in combination with the exemplary embodiments relating to the aspect of the invention described above, a glare shield device is described which is configured to selectively block light from a source of glare at least partially for an eye of a viewer. The features for glare shield devices described in this application and/or for surfaces/displays which can be darkened can also be applied to this glare shield device. The glare shield device includes a multiplicity of translucent layers, each having a multiplicity of elements. The translucency of the multiplicity of elements can be changed separately. The elements of the multiplicity of elements each have a viewing direction range, wherein a reduction in the translucency of an element is perceived more strongly when viewing with an eye of the viewer from a direction within the viewing direction range than when viewing from a direction outside the viewing direction range. The viewing direction ranges of the elements of two different layers of the multiplicity of translucent layers can be different. This can ensure that the light from differently positioned sources of glare can be blanked out without artifacts for at least one eye of the viewer.

The glare shield device can be configured to select a first layer of the multiplicity of translucent layers as a function of a position of the source of glare, with the result that the source of glare for a first eye of the viewer is located within the viewing direction range of at least one element of the multiplicity of elements of the first layer, and in this way the source of glare for a second eye of the viewer is located outside the viewing direction range of the at least one element of the multiplicity of elements of the first layer. This permits the artifact-free blanking out of a source of glare for the first eye.

According to a third aspect of the invention, which can now be provided in combination with the embodiments of the first and/or the second aspect of the invention described above or independently thereof, a glare shield device is described which is configured to selectively block light from a source of glare at least partially for an eye of a viewer. The features, described in this application, for glare shield devices and/or for surfaces/displays which can be darkened can also be applied to this glare shield device. The glare shield device includes at least a first translucent layer having a multiplicity of elements. The translucency of the multiplicity of elements can be changed separately. The elements of the multiplicity of elements each have an, in particular, limited viewing direction range, wherein a reduction in the translucency of an element is perceived more strongly with an eye of the viewer from a direction within the viewing direction range than when viewing from a direction outside the viewing direction range. The viewing direction ranges of the elements can change along the surface axis of the first translucent layer. As a result it can be ensured that the light from differently positioned sources of glare can be blanked out without artifacts for at least one eye of the viewer.

As already stated above, a viewing direction range can have a direction range boundary. The direction range boundaries of the viewing direction ranges of the elements along the surface axis of the first translucent layer can be directed onto a common point on a transverse axis perpendicular with respect to the surface axis of the first translucent layer. The common point can correspond, in particular, to a center point on an axis between the first eye and the second eye of the viewer. By means of such an arrangement of elements and their viewing direction ranges it can be ensured that sources of glare can be blanked out along the entire surface axis without artifacts.

The glare shield device can be configured to determine a focal point. The focal point can correspond to the center point on the axis between the first eye and the second eye of the viewer. The direction range boundaries of the viewing direction ranges of the elements along the surface axis of the first translucent layer can be changed or adapted in such a way that the direction range boundaries are directed onto the focal point. In particular, the glare shield device can be configured to regulate the direction range boundaries with respect to a changing focal point by means of a control loop. It can therefore be ensured that sources of glare can be blanked out without artifacts even in the case of changing head positions.

The regulation with respect to a changing focal point can be carried out for a glare shield device with one or more translucent layers. Furthermore, the regulation can be carried out for a translucent layer with viewing direction ranges which are uniform (along the layer) and/or with viewing direction ranges which are different (along the layer). The viewing direction ranges can be regulated in such a way that one of the direction range boundaries points to the focal point (for example to the first or to the second eye or to a center point between the first and second eye), as illustrated, for example, in FIG. 5a and FIG. 5b.

According to a fourth aspect of the invention, which aspect can be seen in combination with the embodiments described above of the first, second and/or third aspects of the invention or independently thereof, a glare shield device is provided for a vehicle, which device is configured to selectively block light from a source of glare at least partially for an eye of a viewer, wherein the glare shield device includes at least one translucent layer having a multiplicity of elements, and wherein the translucency of the multiplicity of elements can be changed separately. The glare shield device is configured here to determine data relating to an acceleration of the vehicle;
to predict a position of the eye of the viewer taking into account the data relating to the acceleration of the vehicle;
to select an element from the multiplicity of elements of the translucent layer, with the result that the element lies on a light trajectory between the source of glare and the predicted position of the eye of the viewer; and
to reduce the translucency of the selected element.

According to this aspect, in particular the light coming from the source of glare can be blanked out or darkened in such a way that the surroundings of the source of glare can continue to be seen through the glare shield device. In other words, the light coming from the source of glare can be blanked out on a punctiform basis. The glare shield device can be arranged, for example, on a window of a vehicle (for example on a front windshield). Alternatively or additionally, the glare shield device can be arranged along a movable glare shield (similar to a contemporary sun shield). The glare shield device (in particular a surface of the glare shield device which can be darkened) typically has a surface extent with a specific width (horizontal) and a specific depth (vertical) in order to be able to blank out sources of glare at various positions.

The respective glare shield device includes, in particular, at least one translucent layer (also referred to as a translucent display) having a multiplicity of elements. An exemplary layer can include an LC (liquid crystal) display. The translucency of the multiplicity of elements can be changed separately and/or independently of one another. In particular the multiplicity of elements can include a matrix of elements which can be individually "darkened".

The glare shield device can be configured, in particular, to determine data relating to an acceleration or rotation of the vehicle. This data can be referred to as a movement data. The movement data can be acquired, for example, with a gyro sensor and/or acceleration sensor. This sensor is referred to below as "gyro/acceleration sensor". The sensor for sensing the acceleration of the vehicle can be located at or in the glare shield device. In particular, the sensor can be rigidly coupled to the translucent layer.

The glare shield device can also be configured to predict a position of the viewer's eye by taking into account the data relating to the acceleration of the vehicle. For this purpose, if appropriate a transmission function can be taken into account, wherein the transmission function represents a relationship between an acceleration of the vehicle and a resulting movement of the eye of the viewer. The position of the eye of the viewer can therefore also be predicted by taking into account the transmission function. The acceleration of the vehicle can include, in particular, a vertical acceleration of the vehicle (vertically with respect to an underlying surface) and/or a transverse acceleration of the vehicle (transversely with respect to the direction of travel).

The glare shield device can also be configured to select an element from the multiplicity of elements of the translucent layer, with the result that the element lies on a light trajectory between the source of glare and the predicted position of the eye of the viewer. Furthermore, the glare shield device is configured to reduce the translucency of the selected element. Therefore, by means of the glare shield device it is possible to selectively blank out a source of glare (possibly a punctiform one), and to continue to make available a field of vision for the viewer which is as large as possible.

The glare shield device can be configured to receive image data from a camera directed onto the viewer. Such a camera is also referred to as a rear-view camera in this application. The position of the eye of the viewer can be determined on the basis of the image data. However, taking into account the acceleration of the vehicle during the "predictive" determination of the position of the eye of the viewer makes it possible to control the position of the punctiform darkening in terms of timing in such a way that the source of glare is covered in a precisely fitting fashion by the darkening when the predicted position of the eye is reached. Therefore, taking into account the acceleration of the vehicle makes it possible for a regulating frequency of a control loop for adapting the position of the darkening to be lower than in the case of pure "follow-on regulation" to an eye position which has already been reached and is determined by means of the rear-view camera.

The glare shield device can be configured to determine a viewer-specific transmission function. For this purpose, the transmission function can be stored, for example, in a memory unit which can be accessed by the glare shield device. Alternatively or additionally, the glare shield device can be configured to determine the transmission function which is specific to a viewer in a training phase. In this case, during the training phase, the movements of the eye of the viewer can be detected for a multiplicity of accelerations of the vehicle. From the training data which is acquired in this way, a viewer-specific transmission function can then be determined. By determining the viewer-specific transmission function it is possible to improve the prediction results.

The layer shield device can be configured to select, with a predefined iteration frequency, one or more elements which lie on the light trajectory. For this purpose, a regulating algorithm can be used by means of which the one or more elements of the light trajectory can be tracked. Furthermore, the glare shield device can be configured to increase, with the predefined iteration frequency, the translucency of an element which is selected in a (possibly directly) preceding iteration and which has not been selected in a current iteration. Furthermore, the translucency of an element which has not been selected in a preceding iteration and has been selected in the current iteration can be reduced. It is therefore possible for the darkened region of the translucent layer of the changing light trajectory to be tracked, in order to make available a glare shield. Furthermore, a (transparent) field of vision for the viewer which is as large as possible is made available at the same time.

The glare shield device can have, in particular, at least one of the following further features:
- it can include a sensor which is configured to acquire the data relating to the acceleration of the vehicle.
- It can be configured to determine a transmission function, wherein the transmission function represents a relationship between an acceleration of the vehicle and a resulting movement of the eye of the viewer, and wherein the position of the eye of the viewer is also predicted by taking into account the transmission function.
- It can be configured to determine a user-specific transmission function.
- It can be configured to determine, in a training phase, the transmission function which is specific to the viewer and to detect the movements of the eye of the viewer for a multiplicity of accelerations of the vehicle.
- It can be configured to receive image data from a camera which is directed onto the viewer and to predict the position of the eye of the viewer also by taking into account the image data.
- It can be configured with a predefined iteration frequency,
  - to select one or more elements which lie on the light trajectory;
  - to increase the translucency of an element which has been selected in a preceding iteration and not selected in the current iteration; and
  - to reduce the translucency of an element which has not been selected in the preceding iteration and has been selected in the current iteration.

According to a further aspect, a method for selectively reducing the light from a source of glare for an eye of a viewer by means of a glare shield device for a vehicle is described. The glare shield device includes here at least one translucent layer having a multiplicity of elements. The translucency of the multiplicity of elements can be changed separately. The method includes the following steps:
- determining data relating to an acceleration of the vehicle;
- predicting a position of the eye of the viewer taking into account the data relating to the acceleration of the vehicle;
- selecting an element from the multiplicity of elements of the translucent layer with the result that the element lies on a light trajectory between the source of glare and the predicted position of the eye of the viewer; and
- reducing the translucency of the selected element.

The determination of the data relating to an acceleration of the vehicle can be carried out, in particular, by means of a gyro/acceleration sensor.

According to a fifth aspect of the invention, which can be considered in conjunction with one or more of the aspects mentioned above and the exemplary embodiments thereof, or independently thereof, a glare shield device is provided which is configured to be arranged movably in the passenger compartment of a vehicle, with the result that the glare shield device can be moved into a folded-down position and into a folded-up position, wherein in the folded-down position the glare shield device conceals the view of an occupant of the vehicle of part of a window of the vehicle. The glare shield device includes here

- a carrier part through which a base portion of a glare shield area of the glare shield device is made available; and
- a movable part which is movably arranged in the glare shield device and which is configured to increase the glare shield area of the glare shield device beyond the base portion.

This glare shield device can also be referred to as a glare shield. The glare shield device is configured, in particular, to be movably arranged in the passenger compartment of a vehicle, with the result that the glare shield device can be moved into a folded-down position and into a folded-up position. For this purpose, the glare shield device can have an axis about which the glare shield device can be moved. The glare shield device (in particular the axis of the glare shield device) can be mounted on or in the vicinity of the upper edge of a front windshield of the vehicle.

The glare shield device can be arranged in the vehicle in such a way that in the folded-down position the view of an occupant of the vehicle of part of a window (for example the front windshield) of the vehicle is concealed by a glare shield area of the glare shield device. In other words, in the folded-down position the glare shield area can engage in a field of vision or in a range of vision of the occupant through the window of the vehicle. In this context, the glare shield area can be at least partially translucent, with the result that although the glare shield area conceals the view of the window of the vehicle, the occupant can still look through the translucent part of the glare shield area onto the window and therefore also onto the surroundings of the vehicle. In the folded-up position, the glare shield device typically lies outside the field of vision of the vehicle occupant.

The glare shield device includes, in particular, a carrier part through which a base portion of a glare shield area of the glare shield device is made available. In other words, a specific (possibly minimum) extension level of the glare shield area can be made available by means of the carrier part. In this context, minimum is to be understood in the sense that the functionality of the glare shield device can be scaled. Furthermore, the glare shield device includes a movable part which is movably arranged in the glare shield device and which is configured to increase the glare shield area of the glare shield device beyond the base portion. In other words, the movable part can be used to increase the glare shield area according to requirements. In particular, the movable part can be configured in such a way that in the folded-down state the glare shield area can be increased in the vertical direction (for example perpendicularly with respect to an axis of the glare shield device).

Making available a movable part has the advantage that by means of the carrier par a glare shield device can be made available with a reduced glare shield area which, depending on the requirements, can be increased by means of the movable part. This is advantageous, in particular, in convertible vehicles with respect to the flow behavior of the glare shield device as well as for the reduced concealment of the sky by the glare shield device when the soft top of the vehicle is open (in order to allow an upward view which is as free as possible).

The movable part can have a translucent area whose translucency can be changed. The translucent area is also referred to as an area that can be darkened in this application. The translucent area includes, for example, an LC (liquid crystal) display. The translucent area can include a multiplicity of elements (for example a matrix of elements) whose translucency can be changed independently of one another. This makes it possible to make individual regions of the translucent area non-transparent in order to selectively conceal sources of glare and at the same time affect the occupant's range of vision as little as possible.

Use of a movable part having a translucent area makes it possible to make available a glare shield device by means of which a region of the range of vision of the occupant (for example the driver) which is as large as possible can be concealed. It is therefore also possible to blank out sources of glare which are incident with relatively low angle of incidence through the window of the vehicle (for example the headlights of an oncoming vehicle). The movable part can be removed from the occupant's range of vision at any time (for example by changing the position of the glare shield device or by moving the movable part), and the translucency of the window of the vehicle is not affected by the glare shield device. It is therefore possible to satisfy possible regulations relating to the transparency of windows of a vehicle by means of the described glare shield device.

The glare shield device can include a motor and/or a mechanism which is configured to move the movable part in order to increase or reduce the glare shield area. The use of a motor is advantageous since it makes it possible to avoid a situation in which the occupant touches the movable part (and a translucent area which is possibly located therein) and therefore adversely affects the translucency of the movable part.

The glare shield device (or a control unit) can be configured to determine a position of the glare shield device. In particular, it can be determined whether the glare shield device is in the folded-up position or is moved in the direction of the folded-up position or whether the glare shield device is in the folded-down position or is moved in the direction of the folded-down position. Alternatively or additionally, information relating to a folding-out angle of the glare shield device can be determined, wherein the folding-out angle is at a minimum, for example, in the folded-up position and increases in the direction of a folded-down position. The glare shield device can then be configured to move the movable part as a function of the determined position of the glare shield device. In particular, the overall size of the glare shield area can be changed as a function of the determined position of the glare shield device. This can be advantageous in order, for example, to simplify folding up of the glare shield device (for example guiding past the steering wheel of the vehicle) and/or to permit the glare shield device to cover an increased part of the range of vision of the occupant in the folded-down position.

The glare shield device can have one or more predefined fixed positions. The one or more fixed positions can be configured, for example, in such a way that a risk of injury by the glare shield device is reduced or minimized (for example in the case of a vehicle crash) if the glare shield device is located in the one or more fixed positions. The glare shield device (or a control unit) can be configured to determine the current position of the glare shield device.

Furthermore, the glare shield device (or a control unit) can be configured to compare the current position with the one or more fixed positions. If it is detected that the glare shield device is not located in one of the one or more fixed positions, one or more of the following measures can be initiated: outputting of an (acoustic or optical) warning message and/or automatic movement of the glare shield device into one or more fixed positions (by means of a suitable movement device). Alternatively or additionally, the one or more fixed positions can be implemented by means of a "latching in" mechanism. By means of such a "latching in" mechanism it can be ensured that the glare shield device can be permanently positioned only in one of the one or more fixed positions. Making available fixed positions makes it possible to reduce the risk of injury associated with the glare shield device.

In particular, the glare shield device can be configured to reduce the glare shield area if the glare shield device is in the folded-up position or is moved in the direction of the folded-up position. Alternatively or additionally, the glare shield device can be configured to increase the glare shield area if the glare shield device is in the folded-down position or is moved in the direction of the folded-down position. Furthermore, the glare shield device can be configured to determine a folding-out angle of the glare shield device and to increase the glare shield area with an increasing folding-out angle.

The glare shield device can include a sensor or a means for determining the position and/or the folding-out angle of the glare shield device. The sensor can include, for example, a gyro sensor. In particular the glare shield device can include a gyro/acceleration sensor. The sensor can be securely and/or rigidly connected to the glare shield device. The sensor can include a "gyro sensor" for the determination of rotational movements and/or an "acceleration sensor" for the determination of linear accelerations. On the basis of the gyro sensor, the rotational movement of the glare shield device can be detected (for example for determining a folding-out angle of the glare shield device).

The glare shield device can be configured to determine information relating to a light trajectory between a source of glare and an eye of the occupant of the vehicle. For this purpose, the glare shield device can have recourse to image data of a front-mounted camera and of a rear-view camera in order to determine the position of the source of glare and the position of the eye or eyes of the occupant. The light trajectory can be determined on the basis of the positions.

The glare shield device can be configured to reduce the translucency of the translucent area in a first region in order to reduce a dazzling effect of the source of glare on the occupant of the vehicle. Other regions of the translucent area can also have a relatively high level of translucency in order to reduce the range of vision of the occupant as little as possible.

The glare shield device can also be configured to increase the glare shield area in such a way that the translucent area of the movable part extends into the light trajectory. In particular, the movable part can be increased only to such an extent that blanking out of the source of glare is made possible. This has the advantage that the translucent area covers only a part of the range of vision of the occupant which is as small as possible, and the occupant therefore has a view of the window of the vehicle which is as free (and unattenuated) as possible.

In particular, a glare shield device can be configured to determine that no source of glare is present whose light trajectory with respect to the eye of the occupant of the vehicle can be at least partially concealed by the translucent area of the movable part. The glare shield device (for example the control unit) can also cause the glare shield area to be reduced, i.e. the movable part to be moved in such a way that the glare shield area is reduced. It is therefore possible to ensure that the movable part is moved into the field of vision of the occupant only when this is necessary to blank out a source of glare. In this way, the viewing conditions for the driver can be improved (on average).

The glare shield device can include a front-mounted camera which is arranged in or on the glare shield device in such a way that in the folded-down position the front-mounted camera can capture the surroundings of the vehicle through the window of the vehicle. In particular, the front-mounted camera can be arranged on the carrier part. Furthermore, the glare shield device can include a rear-view camera which is arranged in or on the glare shield device in such a way that in the folded-down position the rear-view camera can capture the passenger compartment of the vehicle. In particular, the rear-view camera can be arranged on the carrier part. The front-mounted camera and/or the rear-view camera can each be part of a camera system. The glare shield device can therefore include a front-mounted camera system and/or a rear-view camera system. The cameras and/or the camera systems can be mono cameras or stereo cameras/mono camera systems/stereo camera systems.

If the front-mounted camera and the rear-view camera are implemented as part of the glare shield device, the glare shield device becomes independent of other vehicle components. In particular, in this way a glare shield device can be made available which can be installed as a "stand-alone" unit in already existing vehicles.

The glare shield device can be configured to reduce the translucency of the translucent area in a region whose depth decreases along a transition between the carrier part and the movable part. The darkened region can be, for example, in the shape of a wedge. The depth can be reduced, in particular, with increasing distance from an oncoming roadway of the vehicle. As a result low-lying sources of glare (for example the headlights of an oncoming vehicle) can be blanked out and furthermore very largely unrestricted vision of the traffic on the driver's own roadway is possible.

The window of the vehicle (for example the front windshield) can have a first polarization plane in which light is preferably transmitted. Furthermore, the translucent area can have a second polarization plane in which light is preferably transmitted. The translucent area can be arranged in the glare shield device in such a way that in the folded-down position the first and second polarization planes substantially correspond. As a result, the occupant's view through the window can be as adversely affected as little as possible by the translucent area (in the translucent state). Furthermore, as a result of the use of the translucent area (and the polarization of the light associated therewith) unpleasant reflections on the window of the vehicle can be eliminated.

The carrier part can be non-translucent. Furthermore, the carrier part can have the dimensions of a conventional sun shield of a vehicle. On a rear side which, in the folded-down position of the glare shield device, faces the passenger compartment of the vehicle, the carrier part can have a mirror. The carrier part can therefore be used to make available the functions of a conventional sun shield. As a result, the acceptance of the glare shield device described in this application for the occupant of the vehicle can be increased.

As stated above, the movable part of the glare shield device can be movably arranged. For this purpose, the carrier part can include or form a sleeve with a cavity for accommodating the movable part. By means of the sleeve, a translucent area arranged on the movable part can be protected against soiling and/or against damage.

According to a sixth aspect of the invention, which can be considered independently or in combination with the previously mentioned aspects and their exemplary embodiments of the invention, a glare shield device is described which is configured to be movably arranged in the passenger compartment of a vehicle, with the result that the glare shield device can be moved into a folded-down position and into a folded-up position. The glare shield device can be configured in such a way that in the folded-down position it conceals the view of an occupant of the vehicle of part of a window of the vehicle. The glare shield device includes a glare shield area. The glare shield area can have a curvature. In the folded-down position of the glare shield device, the curvature can be convex in relation to the window of the vehicle. Further features of the glare shield device which are described in this application can also be used for this glare shield device.

The use of a curved glare shield area has the advantage that the glare shield area can be introduced further into the range of vision of the occupant of the vehicle and nevertheless the glare shield device can conveniently be moved into various positions (in particular into the folded-up and folded-down positions). The use of a curved glare shield area also provides the advantage that a relatively large distance is produced between the driver and the glare shield area, which distance ensures increased comfort (free space for hands and head) and reduced risk of injury and damage (for example as a result of becoming caught on the glare shield area, for example when entering or exiting the vehicle). Furthermore, in the case of a glare shield device with a translucent part a relatively large effective region which can be darkened is made available by virtue of the curvature. Furthermore, the translucent part can be positioned transversely with respect to the viewing direction and can therefore be used, if appropriate, as a display or monitor (for example for displaying information). The displaying of information can occur as a function of the driving situation.

According to a seventh aspect of the invention, which can be considered independently or in combination with the previously mentioned aspects and their exemplary embodiments of the invention, a glare shield device is configured to be arranged movably in the passenger compartment of a vehicle, with the result that the glare shield device can be moved into a folded-down position and into a folded-up position, wherein in the folded-down position the glare shield device conceals the view of an occupant of the vehicle of a part of a front windshield of the vehicle. The glare shield device also includes a first glare shield area which has a translucent area whose translucency can be changed; and a non-transparent glare shield area which is movably arranged and which is configured to at least partially cover the first glare shield area in a first position, and to cover a side window of the vehicle in a second position if the glare shield device is in the folded-down position.

The glare shield device can be embodied as a double flap. Further features of the glare shield device described in this application can also be used for this glare shield device. In the folded-down position, the glare shield device can conceal the view of an occupant of a vehicle of part of a front windshield of the vehicle. The glare shield device includes a first glare shield area (for example a first area in the sense of a first flap of a double flap) which has a translucent area whose translucency can be changed. Furthermore, the glare shield device can include a non-transparent glare shield area (for example a second area in the sense of a second flap of a double flap) which is movably arranged (for example on the first glare shield area) and which is configured to at least partially cover the first glare shield area (i.e. the first flap) in a first position, and to cover a side area of the vehicle in a second position, when the glare shield device is in the folded-down position. Therefore, protection against glare at the front and at the side can, where appropriate, be provided simultaneously and efficiently.

The glare shield device in particular according to the fifth, sixth and seventh aspects of the invention can also have one of the following features:

The glare shield device can have a movable part which has a translucent area whose translucency can be changed.

The glare shield device can include a motor which is configured to move a movable part in order to increase or reduce the glare shield area.

The glare shield device can be configured,
  to determine a position of the glare shield device and
  to move the movable part as a function of the determined position of the glare shield device.

The glare shield device can be configured to reduce the glare shield area if the glare shield device is in the folded-up position or is moved in the direction of the folded-up position and/or
  to increase the glare shield area if the glare shield device is in the folded-down position or is moved in the direction of the folded-down position.

The glare shield device can be configured to determine a folding-out angle of the glare shield device and to increase the glare shield area as the folding-out angle increases.

The glare shield device can be configured to determine information relating to a light trajectory between a source of glare and an eye of the occupant of the vehicle.

The glare shield device can be configured to reduce the translucency of the translucent area in a first region in order to reduce a dazzling effect of the source of glare on the occupant of the vehicle.

The glare shield device can be configured to increase the glare shield area in such a way that the translucent area of the movable part extends into the light trajectory.

The glare shield device can be configured to determine that there is no source of glare present whose light trajectory with respect to the eye of the occupant of the vehicle can be at least partially concealed by the translucent area of the movable part, and to subsequently reduce the glare shield area.

The glare shield device can be configured that
  if the window of the vehicle has a first polarization plane in which light is preferably transmitted,
  the translucent area has a second polarization plane in which light is preferably transmitted, wherein
  the translucent area is arranged in such a way that in the folded-down position the first and second polarization planes substantially coincide.

The glare shield device can be configured to reduce the translucency of the translucent area in a region whose depth decreases along the transition between the carrier part and the movable part.

The glare shield device can be configured such that the movable part is designed in such a way that in the folded-down state the glare shield area can be increased in the vertical direction.

The glare shield device can include a sensor for determining a position of the glare shield device.

The glare shield device can include:
- a front-mounted camera which is arranged in the glare shield device in such a way that in the folded-down position the front-mounted camera can capture a surrounding area of the vehicle through the window of the vehicle,
- and a rear-view camera which is arranged in the glare shield device in such a way that in the folded-down position the camera can capture a passenger compartment of the vehicle,
- wherein the front-mounted camera and/or the rear-view camera can be arranged on the carrier part.

The glare shield device can be configured in such a way that the carrier part is non-translucent and/or
- has a mirror on a rear side which, in the folded-down position, faces a passenger compartment of the vehicle,
- and/or
- includes a sleeve with a cavity for accommodating the movable part.

According to a further aspect of the invention, a vehicle (for example a passenger car, a truck or a rail vehicle) is described which includes a glare shield device which is described in this application.

According to a further aspect of the invention, methods for making available a glare shield are described. These methods include method steps which correspond to the features of the glare shield devices respectively described in this application.

According to a further aspect of the invention, a software (SW) program is described. The SW program can be configured to be executed on a processor (for example on a control unit) and as a result to execute a method which is described in this application.

According to a further aspect of the invention, a storage medium is described. The storage medium can include a software program which is configured to be executed on a processor and as a result to carry out a method which is described in this application.

It is to be noted that the respective aspects of the invention, methods, devices and systems which are described in this application can be used both alone as well as in combination with other aspects of the invention, methods, devices and systems which are described in this application. Furthermore, any aspects of the methods, device and systems which are described in this application can be combined with one another in a variety of ways. In particular, the features of the claims can be combined with one another in a variety of ways.

In the text which follows, the invention will be described in more detail by means of exemplary embodiments. In the drawings:

Other objects, advantages and novel features of the present invention will become apparent from the following detailed description of one or more preferred embodiments when considered in conjunction with the accompanying drawings.

DETAILED DESCRIPTION OF THE DRAWINGS

As stated at the beginning, the present application is concerned with reducing the dazzling effect of one or more sources of glare for a driver of a vehicle.

In this context, a sun shield is described which includes at least one region which can be darkened or one area which can be darkened. The sun shield can be attached to an upper frame of the vehicle in such a way that it can be folded down, with the result that the sun shield can be folded down into the range of vision of the driver. On the other hand, the sun shield can also be folded upward, in order to remove the sun shield from the range of vision of the driver. By using a sun shield, it is possible for the windshield of the vehicle to be kept unchanged. In particular, it is possible as a result to ensure that the transparency of the windshield is not reduced by the application of a layer which can be darkened.

Figure 1A:
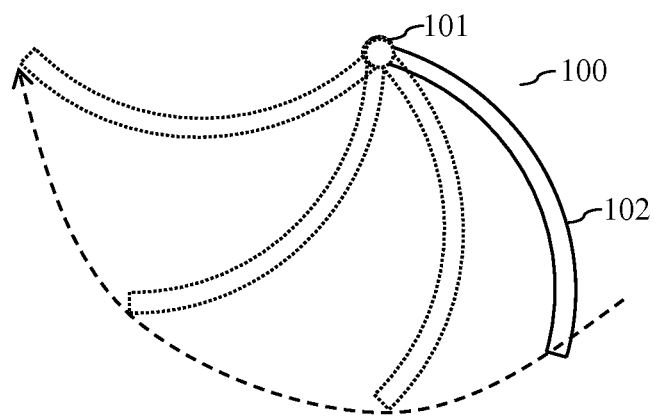
FIG. 1a is a schematic diagram of an exemplary curved glare shield in a side view.

FIG. 1a shows an exemplary glare shield 100 in a side view. The glare shield 100 is presented for the sake of illustration with square edges in FIGS. 1a and 1n further figures. It is to be noted that rounded corners and edges can be used in order to reduce a risk of injury by the glare shield 100. The glare shield 100 is pivotably attached to the vehicle with a shaft 101. Furthermore, the glare shield 100 has a glare shield area 102 which can be used to reduce the dazzling effect of a source of glare on the vision of a driver or occupant of the vehicle. The glare shield 100 presented in FIG. 1a has a curved or arched shape. This can be advantageous in order to reduce, in the case of a predefined region which is to be darkened, the space which is necessary for the pivoting process of the glare shield 100. In particular, in this way it can be ensured that even if the glare shield 100 projects further into the range of vision than contemporary sun shields, the glare shield 100 can continue to be folded over and beyond the steering wheel of the vehicle. Furthermore, many advantages are obtained with respect to freedom of movement for the driver, with respect to a reduced risk of damage and with respect to an increase in a portion of the glare shield 100 which can possibly be darkened. The pivoting process of the glare shield 100 is illustrated in FIG. 1a by the dotted glare shield and the dashed arrow. The glare shield 100 preferably has a radius of curvature of approximately 15 cm.

As presented above, the glare shield 100 can project further into the field of vision of a driver or of an occupant than contemporary sun shields (for example by approximately 30% more than a contemporary sun shield). As a result it can be ensured that even relatively low lying sources of glare or light (for example a sun which is low in the sky or the headlights of an oncoming vehicle) can be concealed by the glare shield 100. In particular, the dimensions and the shape of the glare shield 100 can be configured in such a way that persons over a certain body size (for example persons of 160 cm body size and above) can look through the glare shield 100 in such a way that the headlights of oncoming vehicles are concealed. In order to achieve the same objective also for persons with an even smaller body size (for example around 150 cm body size), the glare shield 100 can be mounted on the vehicle with a lowerable suspension means by means of which the glare shield 100 can be lowered by a certain amount (for example by approximately 5 cm). Since small persons typically use a low steering wheel setting, it is nevertheless possible to ensure that the glare shield can be folded up when necessary.

The glare shield 100 can be mounted on the vehicle in such a way that the glare shield can also be folded to the side in order to conceal laterally incident light. Alternatively or additionally, the glare shield 100 can be embodied as a double flap. One flap of the double flap which has a translucent area can then be folded open to the side in the folded-down state of the glare shield in order to conceal light which is incident through a side window of the vehicle. This is illustrated by way of example in FIG. 1f. The glare shield 100 which is illustrated in FIG. 1f includes the glare shield area 102. The shaft 101 can be movably attached to a joint 142. The glare shield area 102 can include a transparent or translucent part 112. The transparent or translucent part 112 can include a non-mirrored transparent window. FIG. 1f shows the glare shield 100 in a front view in front of a windshield 150 of a vehicle.

The glare shield 100 includes a flap 171, which, in a first (folded closed) position, can at least partially cover the glare shield area 102 (in particular the translucent part 112), (this is shown in the top illustration of FIG. 1f). In the first position, the flap 171 can perform the function of a conventional sun shield. For example, the flap 171 can also include a vanity mirror. The flap 171 can be moved into a second (folded open) position by means of a flap shaft 172. The flap 172 can be attached, for example, to the joint 142 (this is shown in the lower illustration of FIG. 1f). In the second position, the flap 171 covers, for example, a side window of the vehicle.

The glare shield 100 includes at least one part which is transparent or translucent, but can be darkened where necessary. The region of the glare shield 100 which can be darkened can include a multiplicity of elements which can be darkened (for example pixels). The elements which can be darkened can each be actuated and darkened individually. The darkened region of the glare shield 100 can therefore be adapted to the shape of a source of glare. In particular, the darkened region of the glare shield 100 can be adapted continuously for the shape, the size and/or position of the source of glare. As a result, with the field of vision of the driver being affected to a small degree, the dazzling effect of the source of glare can be reduced. The region of the glare shield 100 which is transparent and can be darkened can include, for example, an LC (liquid crystal) display. The region of the glare shield 100 which is transparent and which can be darkened typically includes at least the region of the glare shield 100 which engages in the range of vision of the driver onto the road.

Figure 1B:
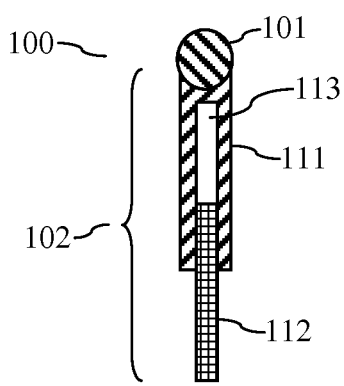
FIG. 1b is a schematic diagram of an exemplary extendible glare shield in a side view.

FIG. 1b shows an exemplary glare shield 100 which can be extended in a side view. The glare shield 100 includes a part 111 which is darkened constantly (also referred to as a carrier area 111) and a part 112 which can be darkened (also referred to as an area which can be darkened or display 112 which can be darkened). The parts 111 and 112 form the glare shield area 102. In the example illustrated in FIG. 1b, the part 112, which can be darkened, of the glare shield 100 is embodied in such a way that it can be pulled or moved out of the part 111 which can be darkened or can be pushed or moved into the part 111. In other words, the glare shield 100 can include a region 112 which can be darkened and which, where necessary, increases the glare shield area 102 of the glare shield 100. For this purpose, the part 111 which is darkened constantly can be embodied as a sleeve with a cavity 113 into which the region 112 which can be darkened can be received. Alternatively or additionally, the area 112 which can be darkened can be pushed behind or in front of the carrier area 111 by means of rails, in order to remove the area 112 from the field of vision of the driver or in order to push it into the field of vision of the driver.

In other words, FIG. 1b shows a glare shield 100 in which a relatively narrow display 112 which is transparent and which can be darkened is integrated into a non-transparent sun shield 111. The display 112 which can be darkened (i.e. the area 112 which can be darkened) can be pulled or moved out from the lower edge of the sun shield. In particular, the sun shield 100 can include a motor and/or a mechanism which is configured to remove the area 112 which can be darkened from the field of vision of the driver or to move it into the field of the vision of the driver. Such a mechanism 124 is illustrated schematically in FIG. 1c.

In particular when driving at night, the dazzling of the driver by oncoming vehicles can be largely eliminated by means of an area 112 which can be darkened and which is located in the field of vision of the driver. In particular, sources of glare which are located at a relatively low position can be blanked out by an area 112 which is located in such a way.

A glare shield 100 which is composed of a darkened area 111 and an area 112 which can be darkened is advantageous since functions of a sun shield which are already known can be maintained. In particular, the darkened area 111 can continue to be used in a known fashion (folding movement to the front and to the rear, folding movement to the side, attachment of a makeup mirror etc.). The additional area 112 which can be darkened (and can, if appropriate, be moved out) can be used to make available protection (if appropriate, adaptive protection) against glare from low-lying sources of glare (such as for example headlights).

An area 112 which can be darkened and can be moved out also permits the depth of the glare shield 100 to be reduced (for example by 3-4 cm). In particular, the darkened carrier area 111 of the glare shield 100 can be reduced in depth (i.e. in the width dimension perpendicularly to the pivoting direction of the glare shield 100). This can be advantageous, in particular, in convertibles for reducing cowl cross sections. In the case of dazzling by the sun, the display screen 112 can be moved out and darkened over an area. The same effective depth as that of a contemporary sun shield can therefore then be made available.

Figure 1C:
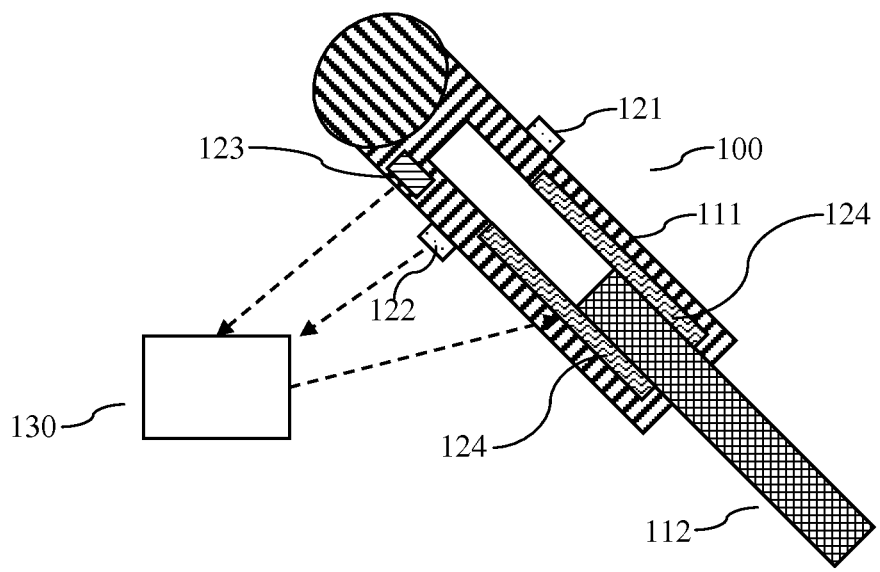
FIG. 1c is a schematic diagram of a further exemplary extendible glare shield in a side view.
Figure 1D:
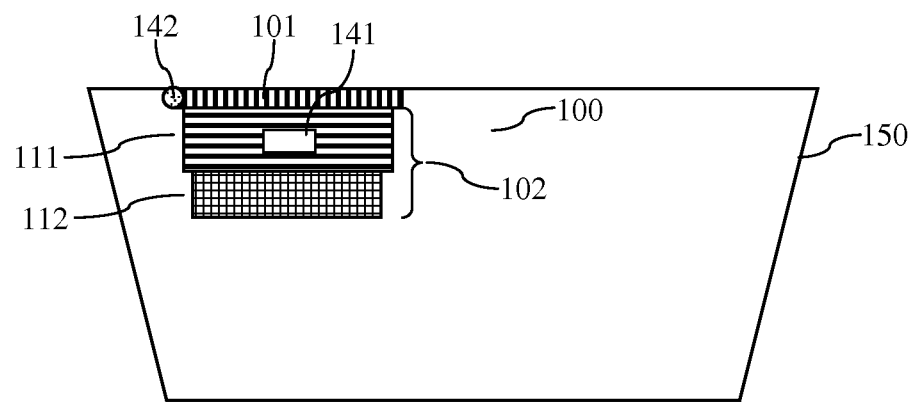
FIG. 1d is a schematic diagram of a windshield with an exemplary glare shield from the point of view of the driver.

The glare shield 100 can include means 123 for determining a folding-out angle of the glare shield 100 (see FIG. 1*c*). An exemplary means 123 for determining the folding-out angle of the glare shield 100 is a gyro sensor. A control unit 130 (for example a control unit of the glare shield 100) can be configured to determine on the basis of the folding-out angle the degree to which the display 112 which can be darkened is moved out. In particular how far the area 112 which can be darkened has to be moved out in order to interrupt a specific trajectory between a light source and an eye of the driver can be determined on the basis of the folding-out angle.

FIG. 1*c* shows a glare shield 100 which includes a front-mounted camera 121 with which external surroundings of the vehicle (typically in front of the vehicle) can be captured. The position of a light source or source of glare can be detected on the basis of the image data captured by the front-mounted camera 121. Furthermore, the glare shield 100 includes a rear-view camera 122 which is configured to capture the passenger compartment of the vehicle. In particular, the position of the eyes of the driver can be determined on the basis of the image data captured by the rear-view camera 122. The control unit 130 can be configured to determine a trajectory between the position of a light source and the position of one eye or both eyes of the driver on the basis of the image data of the front-mounted camera 121 and of the rear-view camera 122 and on the basis of the folding-out angle of the glare shield 100. Furthermore, the control unit 130 can be configured to cause the mechanism 124 to move out the glare shield part 112 which can be darkened to such an extent that the glare shield part which can be darkened extends into the trajectory between the position of the light source and the position of one eye or of both eyes of the driver. Furthermore, the control unit 130 can be configured to darken one or more elements, which can be darkened, of the glare shield part 112 in such a way that a shadow is thrown onto the eye or both eyes of the driver by the light source. Furthermore, the control unit 130 can be configured to darken the glare shield part 112 only to such an extent that the dazzling effect of the light source is eliminated but the range of vision of the driver otherwise remains unimpeded.

Such a glare shield 100 has the advantage that the glare shield part 112 which can be darkened is introduced into the field of vision of the driver only when a source of glare has actually been detected. If no source of glare is detected, the glare shield part 112 can be moved from the driver's field of vision in order to ensure maximum transparency of the field of vision through the windshield of the vehicle.

The protection against glare is typically required only in the folded-down state of the glare shield 100. In other words, by folding down a sun shield a driver typically experiences that he/she is dazzled by a light source and that he/she would like to reduce the dazzling effect. This makes it possible, as shown in FIG. 1*c*, to attach the front-mounted camera 121 (for detecting a source of glare) and the rear-view camera 122 (for detecting the position of the driver's eyes) to the glare shield 100 itself. Furthermore, the control unit 130 can also be implemented as part of a glare shield 100. Therefore, the glare shield 100 can be made available as an independent system and can therefore also be retrofitted into already existing vehicles. It also makes simple mounting of the glare shield 100 in the vehicle possible, since all the components for making available an adaptive protection against glare are integrated into the glare shield 100.

Implementation of the glare shield 100 with a non-transparent carrier part 111 and a transparent part 112 which can be moved out permits the front-mounted camera 121 to be positioned on the non-transparent part 111. In particular, the front-mounted camera 121 can be positioned forwards as close as possible to the viewing axis (if appropriate on the axis) of the occupant (driver). As a result parallax errors can be dealt with so well that a mono-camera 121 and mono-image-processing algorithms can be used for the calculation of light trajectories from a source glare to an eye of the occupant. This is typically not the case when the front-mounted camera 121 is not positioned in the vicinity of the viewing axis of the occupant. The parallax errors then typically require the use of stereo-camera systems and corresponding image processing. The position of the front-mounted camera 121 and/or of the rear-view camera 122 on the glare shield 100 (possibly on the viewing axis of the occupant) therefore makes it possible to reduce the costs and complexity of adaptive glare shield devices.

As stated above, the glare shield 100 can include a mechanism 124 for automatically moving down and/or moving up the glare shield part 112 which can be darkened. This mechanism 124 can be actuated by the control unit 130. By using an automatic mechanism 124 it is possible to avoid, inter alia, a situation in which the driver grasps the glare shield part 112 which can be darkened and as a result reduces the transparency of the glare shield part 112 in the non-darkened state.

The glare shield 100 can be folded up or down by means of the shaft 101. The control unit 130 can be configured to detect the folding down of the glare shield 100 (for example using the means 123 for determining the folding-out angle). Furthermore, the control unit 130 can be configured to cause the above-described detection of a source of glare and the adaptive reduction of the dazzling effect as soon as the folding-out angle reaches or exceeds a predefined threshold value. Alternatively or additionally, the control unit 130 can be configured to cause the mechanism 124 to move up the glare shield part 112 which can be darkened (in order to reduce the depth of the glare shield 100), as soon as the folding-out angle undershoots a predefined threshold value.

Alternatively or additionally, the glare shield 100 can be configured, when folding down (i.e. when increasing the folding-out angle) to latch in only from the time when a predefined minimum folding-out angle has been reached (for example in a predefined fixed position). If the folding-open process is ended by the occupant before the predefined minimum folding-out angle is reached (i.e. before the fixed position is reached), the glare shield 100 can be configured to move back automatically again into the folded-up position. An analogous procedure can be adopted when the folding-out angle is reduced. If the folding-out angle is adjusted to below the predefined minimum value (i.e. before the fixed position) by the occupant, the glare shield 100 can move back automatically into the folded-up position. In other words, the glare shield 100 can be configured to limit the possible positions of the glare shield 100 to one or more fixed positions. This makes it possible for an occupant to move the glare shield only into one of the fixed positions which are to be permitted, for example owing to safety-relevant aspects (for example in the event of crash of the vehicle).

The mechanism for automatically moving onto the folded-up position in the case of the minimum folding-out angle being undershot can be implemented mechanically (for example by means of a spring force) or electrically (for example by means of a motor).

Figure 1E:
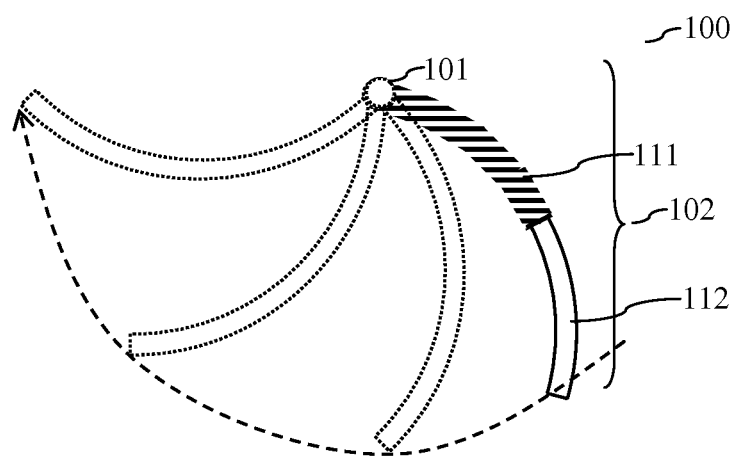
FIG. 1e is a schematic diagram of an exemplary extendible and curved glare shield in a side view.
Figure 1F:
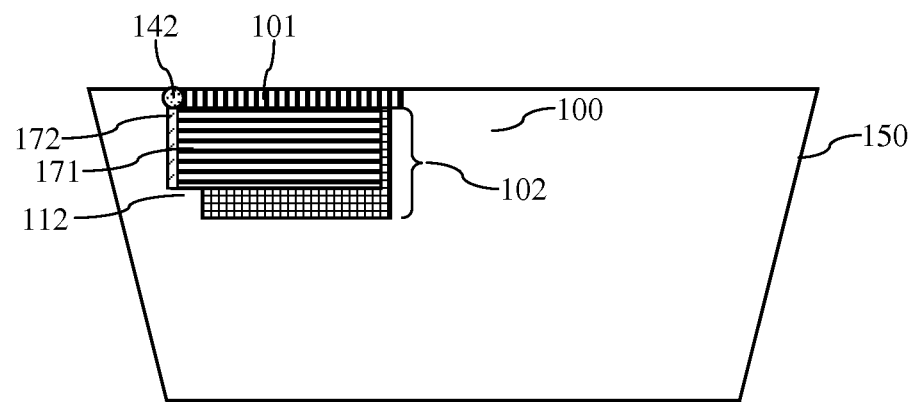
FIG. 1f is a schematic diagram of an exemplary glare shield which is embodied as a double flap.
Figure 1F:
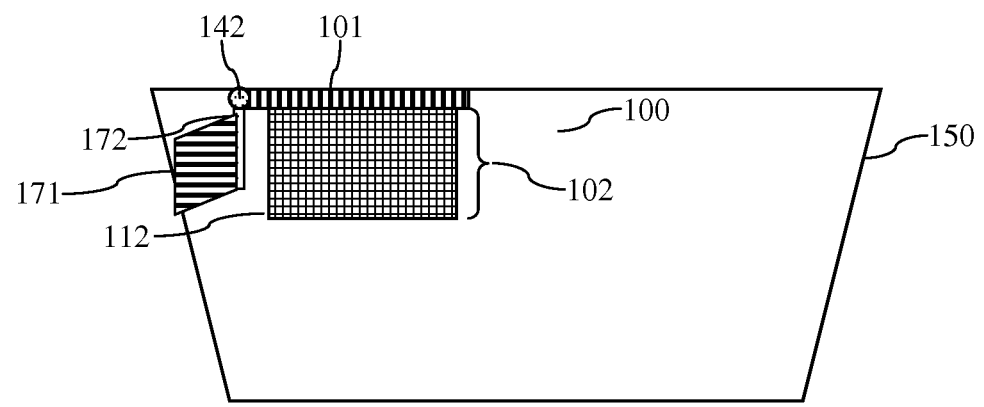

FIG. 1e shows an exemplary curved glare shield 100 in a side view. The glare shield 100 includes a carrier part 111 and a part 112 which can be darkened. The part 112 which can be darkened can be movable, as described in conjunction with FIGS. 1b and 1c. In particular, the part 112 which can be darkened can be moved into the carrier part 111 which then performs the function of a sleeve. As is illustrated in conjunction with FIG. 1c, a front-mounted camera 121 and/or a rear-view camera 122 can also be mounted on a curved glare shield 100.

FIG. 1d shows a view of an exemplary glare shield 100 from the point of view of the driver of the vehicle. The glare shield 100 is mounted on or in the vicinity of the upper edge of the front windshield 150 of the vehicle so as to be pivotable by means of the shaft 101. Furthermore, the glare shield 100 can be moved from the front windshield to the driver-side side window of the vehicle by means of a joint 142, in order to protect against lateral sources of glare. The glare shield 100 shown in FIG. 1d includes the darkened part (i.e. the carrier part) 111 and the part 112 which can be darkened. The part 112 which can be darkened can be movably mounted on the carrier part 111 and it can be used to change the depth of the glare shield 100 (in the direction of the steering wheel of the vehicle). The carrier part 111 of the glare shield 100 can be used for example to make available a vanity mirror 141.

Figure 2A:
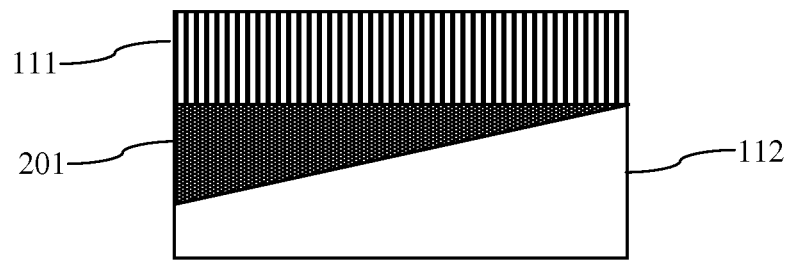
FIG. 2a is a schematic diagram of a front view of an exemplary glare shield with a darkened wedge for blanking out the headlights of oncoming vehicles.
Figure 2B:
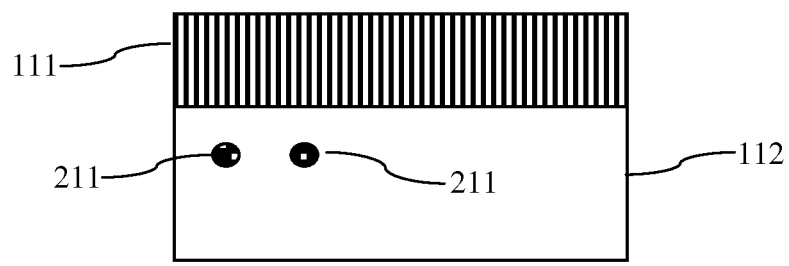
FIG. 2b is a schematic diagram of a front view of an exemplary glare shield with darkened punctiform regions for the punctiform blanking out of the headlights of an oncoming vehicle.

FIGS. 2a and 2b show exemplary darkened portions of the glare shield 100. In a (if appropriate static) mode the glare shield 100 can be configured to introduce a driver-side darkened wedge 201 by means of the part 112 which can be darkened. By means of the darkened wedge 201, it is possible to blank out any light sources which are located in the vehicle-side region in front of the vehicle (for example the headlights of oncoming vehicles). On the other hand, the field of vision of the driver in the remaining region of the part 112 which can be darkened is not adversely affected. The wedge 201 which can be darkened can include different degrees of darkening. In particular, the degree of darkening can increase toward the carrier part 111. It is therefore possible for the field of vision of the driver to be increased further, and nevertheless for blanking out in the driver-side region in front of the vehicle to be brought about.

The shape of the wedge 201, the degree of darkening of the wedge 201 and the size of the wedge 201 can be changeable. For example, the darkened region 201 of the part 112 which can be darkened can be configured by means of a user interface and therefore adapted to the requirements and preferences of a user.

FIG. 2b shows punctiform darkened portions 211 of the part 212 which can be darkened. The position and the size of the darkened portions 212 can be determined by means of the control unit 30, in particular on the basis of the image data of a front mounted camera 121 and the image data of a rear-view camera 122. The darkened portions 211 can be configured in such a way that the darkened portions 211 cause a shadow to be thrown onto the driver's eye by a light source, and therefore cause the dazzling effect by the light source (for example gleaming sky) to be reduced.

The part 112, which can be darkened, of the glare shield 100 can also be used to make available what is referred to as a green wedge. For this purpose, for example an upper region of the part 112 can be darkened in a semi transparent fashion. The dazzling effect of a diffuse light source can therefore be reduced.

Figure 3:
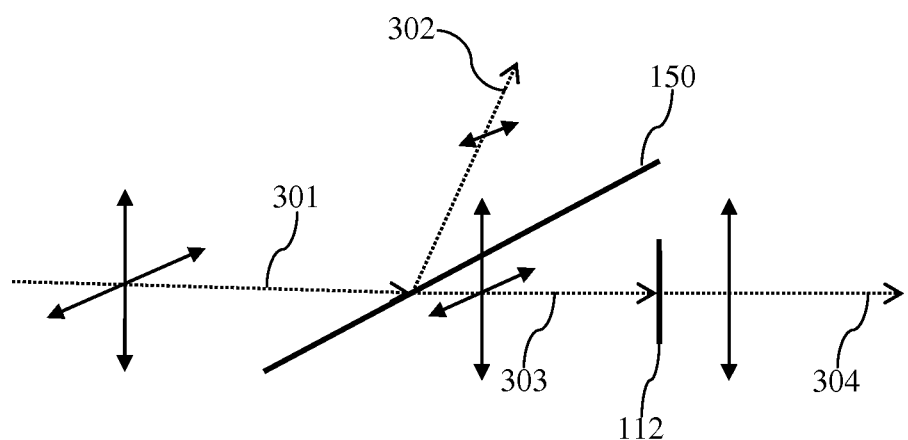
FIG. 3 is a schematic diagram of the polarization of the light which is incident into the passenger compartment of the vehicle.

The part 112 which can be darkened can also be used in a transparent form to reduce unpleasant reflections in the front windshield 150. In particular, the part 112 which can be darkened can be configured to polarize incident light. This is illustrated by way of example in FIG. 3. In particular, FIG. 3 shows a light beam 301 in the outer region of the vehicle, which light beam 301 is not polarized. Partial polarization is typically already brought about in the vertical direction by the front windshield 150 of a vehicle. This leads to a situation in which horizontally polarized light 302 bounces off the front windshield 150 and partially vertically polarized light 303 penetrates the interior of the vehicle through the front windshield 150.

The part 112, which can be darkened, of the glare shield 100 can have the same polarization plane as the front windshield 150. As a result, the combined transparency composed of the front windshield 150 and the part 112 which can be darkened can be maximized. In other words, the energy of the light 304 which reaches the driver can be maximized by matching the polarization planes of the front windshield 150 and the part 112 which can be darkened. Furthermore, the use of such a part 112 which can be darkened has the advantage that undesired reflections on the windshield 150 can be reduced (for example from the upper side of the instrument panel), with the result that the driver is provided with an undisrupted view of the traffic.

As stated above, the present application is also concerned with the reduction of visible artifacts on the basis of the local blanking out of sources of glare. The aspects which are presented below can be applied generally to windows or areas 112 which can be darkened. In particular, the window or area 112 which can be darkened can be part of a front windshield 150 of a vehicle and/or part of a glare shield 100.

Figure 4A:
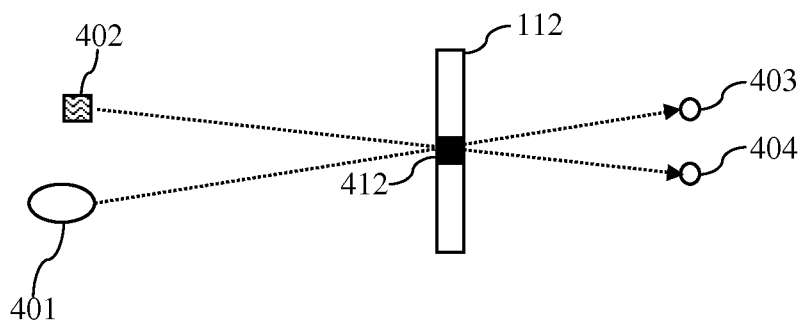
FIG. 4a is a schematic diagram of a visible artifact which is generated by the darkened region of an area which can be darkened.
Figure 4B:
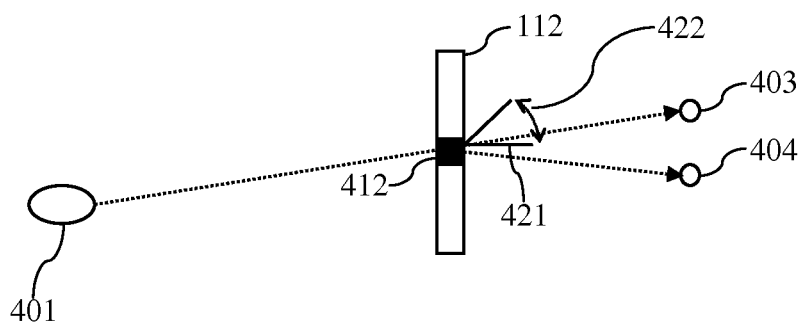
FIG. 4b is a schematic diagram of an exemplary area which can be darkened and by means of which the visible artifact can be eliminated.

FIGS. 4a and 4b show the pair of eyes 403, 404 of a driver of a vehicle. Furthermore, the FIGS. 4a and 4b show a source 401 of glare from which a light beam is thrown onto the right eye 403 of the driver. Between the source 401 of glare and the pair of eyes 403, 404 there is an area 112 which can be darkened. The area which can be darkened has a local darkened portion 412 by which the light beam between the source 401 of glare and the right eye 403 is interrupted. A shadow is therefore thrown onto the right eye 412 by the darkened portion 412, as a result of which the dazzling effect of the source 401 of glare is eliminated or at least reduced.

The darkened portion 412 is also visible to the left eye 404 of the driver. In particular, the darkened portion 412 has the effect that the left eye 404 perceives a phantom spot (402).

The phantom spot 402 can be arranged, for example, to the right next to the source 401 of glare. The phantom spot 402 is typically perceived as being semi transparent, since it is perceived only by the left eye 404, while the right eye 403 of the driver looks past the darkened portion 412 and therefore perceives the surroundings of the vehicle at the location of the phantom spot 402.

The phantom spot 402 constitutes a visible artifact which can be perceived as being disruptive, in particular in daylight. The use of areas 112 which can be darkened and which have the purpose of punctiform blanking out of sources 401 of glare can be adversely affected by this artifact.

Areas 112 which can be darkened can include a matrix of elements which can be darkened. For example, an area 112 which can be darkened can include a liquid crystal layer (liquid crystal, LC) in which the transparency of individual elements is reduced by applying a voltage. Such areas 112 which can be darkened can be configured in such a way that they have a specific viewing direction range. The viewing direction range has the effect that a darkened portion 412 can be seen only in the predefined viewing direction range, for example in a predefined angular range. The darkened portion 412 cannot be seen outside the predefined angular range.

FIG. 4b illustrates the effect of an area 112 which can be darkened and which has a limited viewing direction range 421. The direction range boundaries of the viewing direction range 421 are represented by the sides of a triangle. The viewing direction range 421 has an angle 422 of aperture between the viewing direction boundaries. If the darkened portion 412 is considered within the viewing direction range 421, the darkened portion 412 can be perceived by a viewer. In the example illustrated in FIG. 4b, the darkened portion 412 is therefore perceived by the right eye 403. The left eye 404 looks at the darkened portion 412 from a direction which lies outside the viewing direction range 421. The darkened portion 412 is therefore not perceived by the left eye 404. As a result, the phantom spot 402 is also eliminated. By using an area 112 which can be darkened and which has a limited viewing direction range 421, it is therefore possible to avoid the artifacts caused by local darkened portions 412.

Figure 4C:
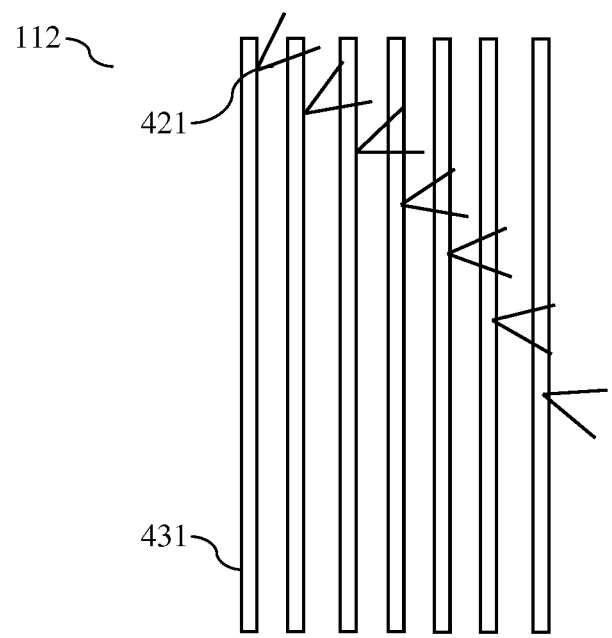
FIG. 4c is a schematic diagram of an exemplary glare shield with a multiplicity of layers which can be darkened.
Figure 4D:
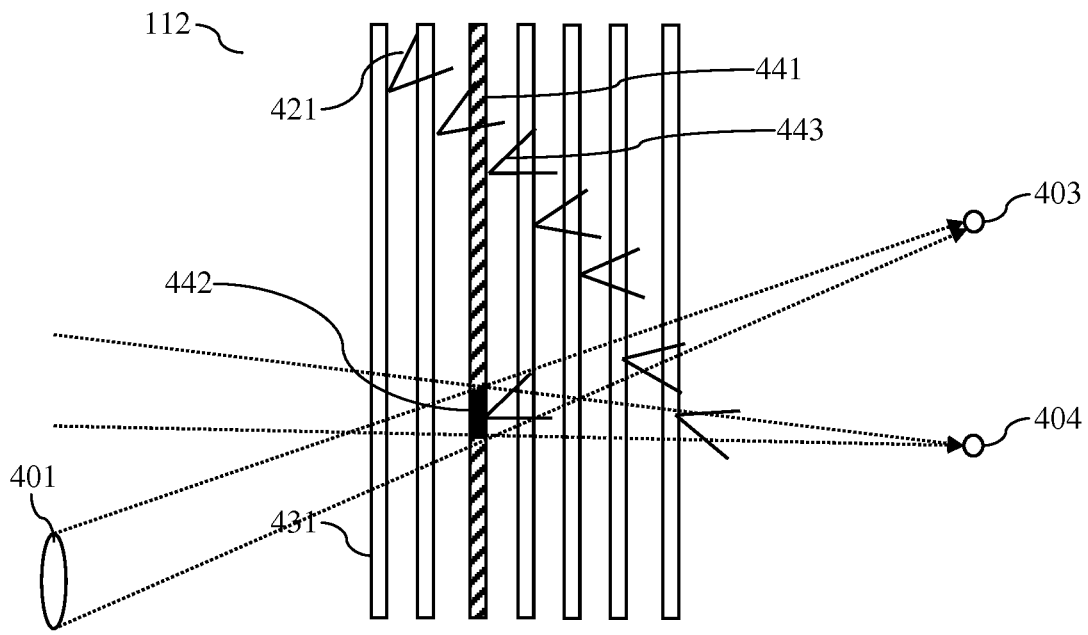
FIG. 4d is a schematic diagram of an exemplary glare shield with a multiplicity of layers which can be darkened and which have the purpose of blanking out a source of glare for the right eye.
Figure 4E:
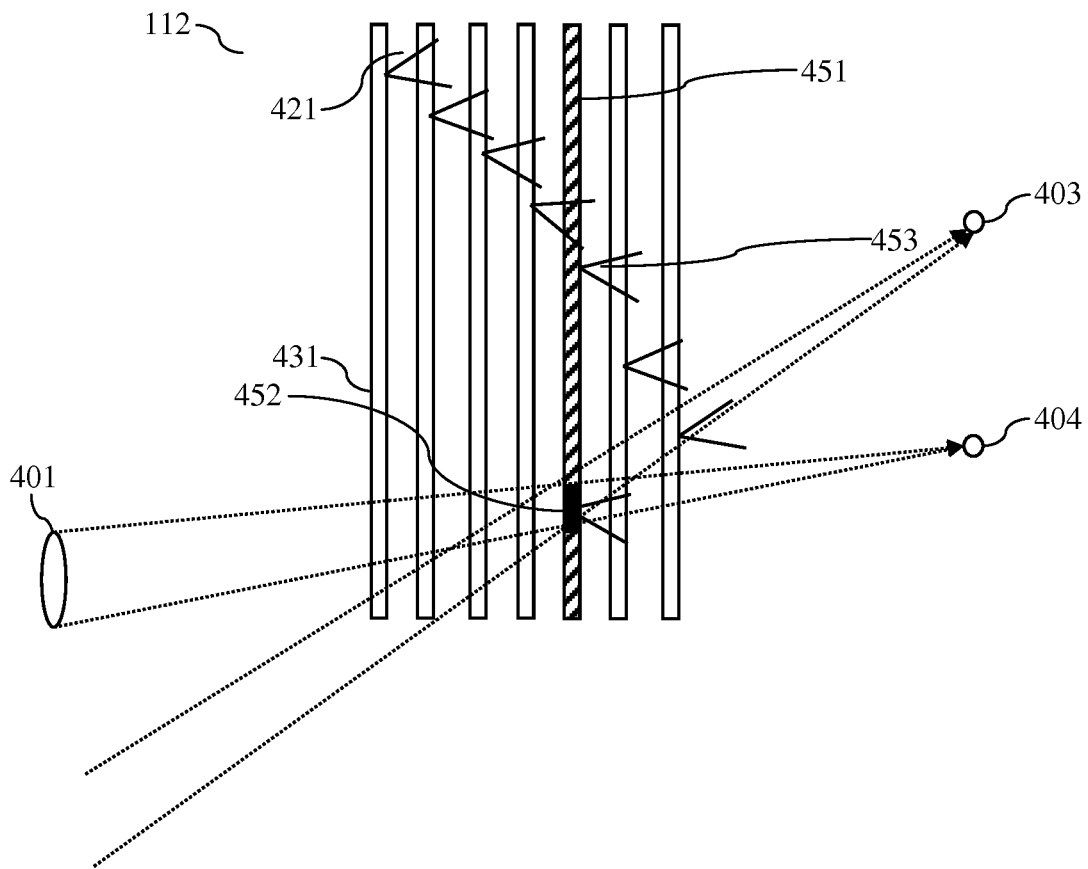
FIG. 4e is a schematic diagram of an exemplary glare shield with a multiplicity of layers which can be darkened and which have the purpose of blanking out a source of glare for the left eye.
Figure 4F:
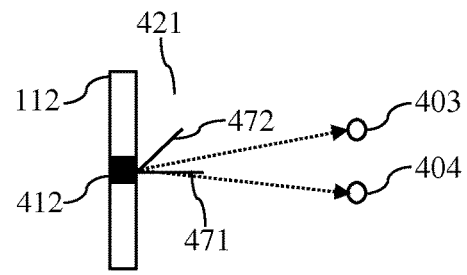
FIG. 4f is a schematic diagram of an exemplary viewing direction range.

The properties of a viewing direction range 421 are illustrated further in FIG. 4f. As is presented in FIG. 4f, a viewing direction range 421 typically includes two direction range boundaries or breakaway edges 471, 472. The viewing direction range 421 forms an interstice whose edges are formed by the direction range boundaries 471, 472. In other words, limitation of the viewing direction range 421 is defined by a direction range boundary 471, 472. The limitation of the viewing range is such that a viewing direction on one side of the direction range boundary 471, 472 lies within the viewing direction range 421 (for example the viewing direction of the right eye 403), and in that a viewing direction on the other side of the direction range boundary 471, 472 lies outside the viewing direction range 421 (for example the viewing direction of the left eye 404).

The viewing direction ranges 421 of elements of an area 112 which can be darkened can have a uniform or a changing orientation. In particular, the viewing direction ranges 421 of the individual elements can be arranged in such a way that one of the direction range boundaries 471, 472 of the viewing direction ranges 421 of the elements points to a common focal point (for example to the right eye 403 or the left eye 404 or to a center point between the right hand and left eyes 403, 404). As is explained in conjunction with FIGS. 5a and 5b, this can be advantageous for the avoidance of phantom spots.

FIG. 4c shows an exemplary area 112 which can be darkened and which has a multiplicity of layers 431 which can be darkened. The individual layers 431 have different viewing direction ranges 421. In other words, the individual layers 431 can be used to generate darkened portions 412 which can be perceived from respective different viewing direction ranges 421, and which cannot be perceived from directions lying outside the respective viewing direction ranges 421. The multiplicity of layers 431 can be embodied in such a way that a darkened portion 412 can be generated for the possible viewing angles of a specific eye 403 onto a source 401 of glare at least through a layer 431 of the multiplicity of layers 431, which darkened portion 412 is perceived by the specific eye 403 (in order to conceal the source 401 of glare), but cannot be perceived by the respective other eye 404 (in order to avoid a phantom spot 402).

Such an exemplary area 112 which can be darkened and which has the purpose of generating darkened portions 412, 422 for the right eye 403 is shown in FIG. 4d. The source 401 of glare can be concealed by a darkened portion 442 in the layer 441 which can be darkened and which has a viewing direction range 443, in such a way for the right eye 403 that the darkened portion 442 lies outside the viewing direction range 443 for the left eye 404, and therefore a phantom spot 402 is not produced.

In an analogous fashion, it is possible to make available an area 112 which can be darkened and which permits the source 401 of glare to be darkened for the left eye 404 by means of a darkened portion 412, 452 which is not perceived by the right eye 403. This is illustrated by way of example in FIG. 4e. The darkened portion 452 in the layer 451 with the viewing direction range 453 makes it possible to ensure that the light source 401 is concealed by the darkened portion 452 for the left eye 404 and at the same time the darkened portion 452 for the right eye 403 lies outside the viewing direction range 453, with the result that the darkened portion 452 cannot be seen by the right eye 403.

The area 112, which can be darkened, for the right eye 403 and the area 112, which can be darkened, for the left eye 404 can have complementary viewing direction ranges. For example, the viewing direction ranges 421 of the layers 431 of the areas 112 which can be darkened can be reflected on an axis passing through a center point of a connection between the right eye 403 and the left eye 404. In this context, the axis runs perpendicular with respect to the connection between the right eye 403 and the left eye 404.

Therefore, in the case of an area or window 112 which can be darkened and which has a multiplicity of layers 431 which can be darkened and which have different viewing direction ranges 421, a first layer 441 and a second layer 451 can be used to blank out a light source 401 respectively for a first eye 403 and a second eye 404 of the driver. In particular, a first darkened portion 442, which darkens the light source 401 for the first eye 403 but cannot be seen by the second eye 404, can be generated by the first layer 441 with a first viewing direction range 443. In a similar way, a second darkened portion 452, which darkens the light source 401 for the second eye 404 but cannot be seen by the first eye 403, can be generated by the second layer 451 with a second viewing direction range 453.

A control unit (for example the control unit 130 of a glare shield 100) can be configured to determine a first trajectory between the light source 401 and the first eye 403, and a second trajectory between the light source 401 and the second eye 404 (for example on the basis of image data of a front mounted camera 121 and a rear-view camera 122). Furthermore, the control unit can be configured to determine the first layer 441 for generating the first darkened portion 442, and to determine the second layer 451 for generating the second darkened portion 452. Furthermore, the control unit can determine the locations for the first and second darkened portions 442, 452 on the first and second layers 441, 451 on the basis of the determined first and second trajectories. It is therefore possible to ensure that the dazzling effect of the light source 401 is reduced or eliminated without generating disruptive artifacts.

A display 112 which can be darkened can therefore include N display layers 431 with different viewing direction ranges 421. The individual display layers 431 can be LC display layers. The number N of the display layers 431 can depend on the distance between the eyes 403, 403 of a driver. Furthermore, the number N can depend on the width (in the horizontal direction) of the display 112 which can be darkened. For example, n=truncate (width of display 112/ distance between the eyes) display layers 431 can be used for each eye 403, 404, i.e. N=2n display layers 431 for the two eyes 403, 404.

Each LC display layer 431 can be configured in such a way that the viewing angle has a "sharp breakaway edge" (i.e. a sharp boundary of the viewing direction range 421) in the horizontal, with the result that for a suitable solid angle the source 401 of glare is concealed for one eye 403 (by a darkened portion 442), but this darkened portion 442 on the display 112 cannot be perceived as a disruptive phantom spot 402 by the other eye 404. As a result of the layering of 2n such display layers 341, which each cover a specific solid angle range 421, phantom spots can be avoided over the entire width of the display 112. In one preferred example, the display 112 includes N=2n=12 layers 341.

Displays 112 with a multiplicity of layers 341, each with fixed viewing direction ranges 521, will be described in conjunction with FIGS. 4d and 4e. In the text which follows, layers 431 with locally continuously varying viewing angles or viewing direction ranges 521 on a layer are described. As is shown, the number of layers 431 which is necessary to avoid phantom spots can be reduced by adapting the viewing angles/viewing direction ranges as a function of the lateral position on a layer.

Figure 5A:
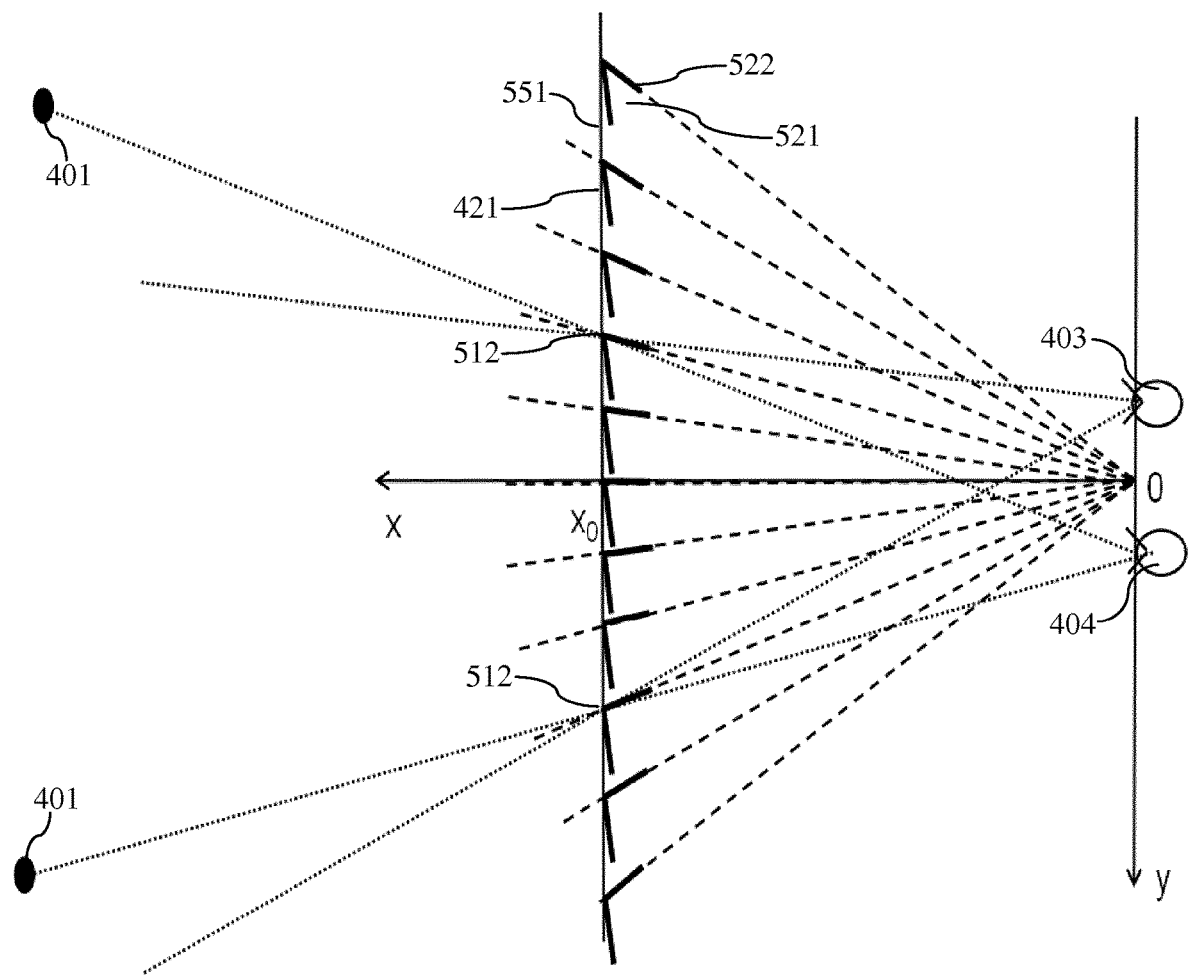
FIG. 5a is a schematic diagram of an exemplary glare shield with a layer which can be darkened and which has a viewing direction range which can vary locally (if appropriate continuously) and which has the purpose of blanking out a source of glare for the left eye.
Figure 5B:
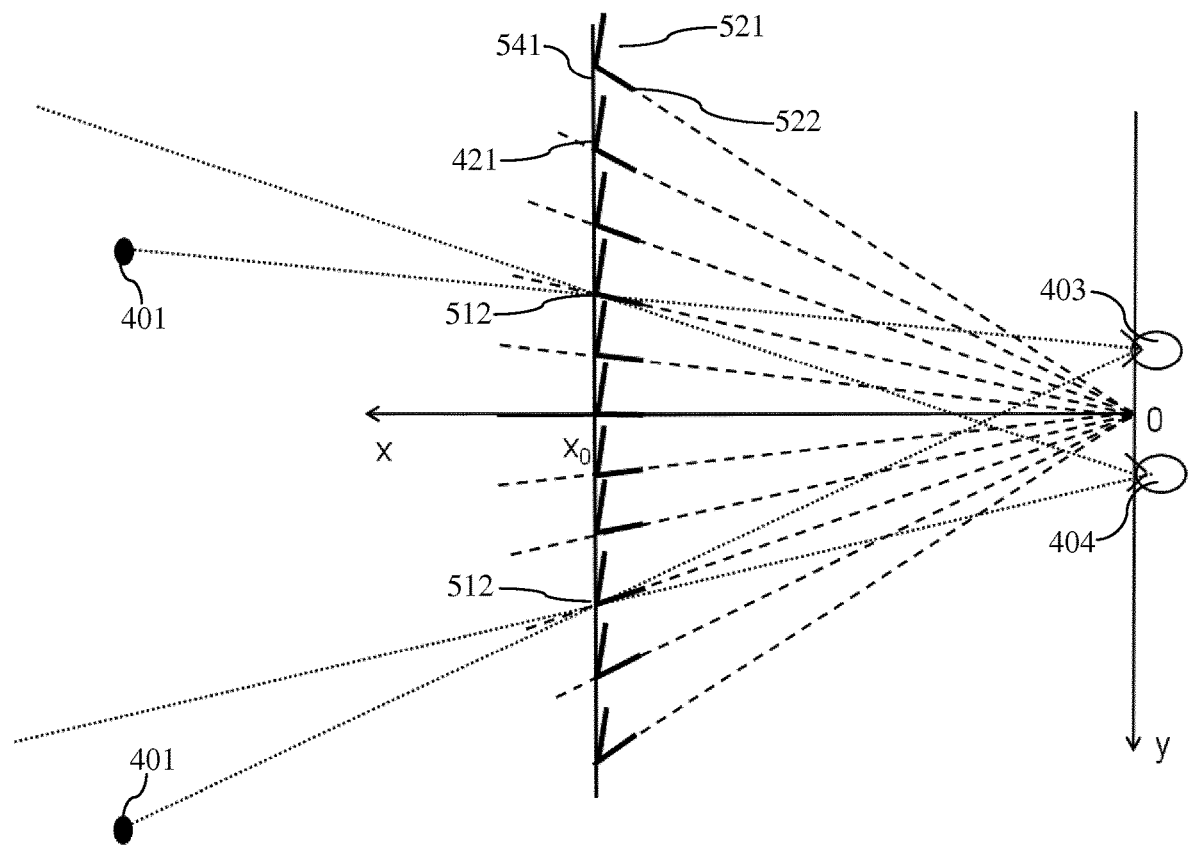
FIG. 5b is a schematic diagram of an exemplary glare shield with a layer which can be darkened and which has a viewing direction range which can vary locally (if appropriate continuously) and which has the purpose of blanking out a source of glare for the right eye.

FIGS. 5a and 5b show exemplary layers 551, 541 of a transparent display 112 which can be darkened, for the second eye 404 and respectively for the first eye 403. The layers 551, 541 each have elements which can be darkened and which have different viewing direction ranges 521. In particular, the viewing direction ranges 521 of a layer 551, 541 change along the width dimension of the layer 551, 541. It is therefore possible to avoid phantom spots 402 even when using just one layer 551, 541 per eye 404, 403.

This is illustrated by way of example in FIG. 5a. FIG. 5a shows two light sources 401 at different positions. Furthermore, FIG. 5a shows the development of the viewing direction ranges 521 of the elements, which can be darkened, of the layer 551 along the width axis y of the layer 551. The viewing direction ranges 521 each have a breakaway edge or boundary (also referred to as a direction range boundary) 522 which is directed toward a center point between the eyes 403, 404 on the width axis y. By means of this arrangement it is possible to ensure that the light sources 401 can be concealed by darkened portions at the locations 512 on the layer 551 for the second eye 404. The viewing angle of the first eye 403 of the locations 512 is, however, outside the viewing direction range 521 of the layer 551 at these locations 512, with the result that the darkened portions cannot be seen by the first eye 403.

The layer 541 for the first eye 403 can be built up in an analogous fashion. The viewing direction ranges 521 of the layer 541 can be reflected with respect to the viewing direction ranges 521 of the layer 551 (in particular at the axis x passing through the center point between the eyes 403, 404 and perpendicularly with respect to the axis y. As is illustrated in FIG. 5b, the light sources 401 can be concealed by darkened portions at the locations 512 on the layer 541 for the first eye 403. The viewing angle of the second eye 404 onto the locations 512 is, however, located outside the viewing direction range 521 of the layer 541 at these locations 512, with the result that the darkened portions cannot be seen by the second eye 404.

A display layer 541, 551 (for example an LCD display) of a display 112 which can be darkened can therefore have "sharp breakaway edges" 522 which vary continuously in the y direction. An LC display layer 541, 551 can be configured in such a way that in the horizontal (i.e. in the x axis) the viewing angles have a sharp breakaway edge, with the result that for the solid angle of a source 401 of glare with respect to an eye 403 the source 401 of glare lies within the viewing direction range (and therefore can be concealed by a darkened portion), but for the solid angle of the same source 401 of glare with respect to the other eye 403 the source 401 of glare lies outside the viewing direction range (and therefore the darkened portion cannot be perceived as a disruptive phantom spot 402).

It is possible to use identical display layers 541, 551 for the first and second eyes 403, 404, but the display layers 541, 551 are rotated through 180° with respect to one another.

By positioning the two display layers 541, 551 for the right eye 403 and for the left eye 404 one on top of the other it is possible to eliminate phantom spots over the entire width of the display.

As can be inferred from FIGS. 5a and 5b, elimination of the phantom spots can be ensured, in particular, when the center point between the eyes 403, 404 of the driver coincides with the center of the radially oriented viewing angle breakaway edges 522. The area 112 which can be darkened (or an associated control unit) can be configured to determine a difference between the centerpoint between the eyes 403, 404 and the center of the radially oriented viewing angle breakaway edges 522. The layers 541, 551 can be configured to change the viewing direction ranges (for example by applying an offset voltage). In particular, the layers 541, 551 can be configured to adjust the abovementioned center in the x direction and y direction, for example by applying offset voltage or voltages to individual, actuatable regions of the displays 541, 551. During operation, the center of the displays 541, 551 can therefore be adjusted to the position between the eyes of the driver.

The area 112 which can be darkened can include a further layer which has one or more viewing direction ranges which include the viewing directions of the two eyes 403, 404 along the entire width of the layer. As a result it is possible to ensure that the area 112 which is capable of being darkened can be darkened (for both eyes 403, 404). Furthermore, such a further layer can be used to switch the display 112 to a completely black state, in order to serve as a background for a further self illuminating display layer which is applied over the latter (for example AMOLED technology). As a result, the area can be used as a monitor for displaying information (as a function of the driving situation).

As stated above, a sensor unit 130 of the glare shield 100 or of the glare shield device can be configured to determine the position of one or more darkened portions 412 on the area 112 which can be darkened, with the result that corresponding one or more sources 401 of glare are darkened. In particular, a light trajectory between a source 401 of glare and an eye 403 of the occupant can be determined on the basis of the image data of the front mounted camera 121 and/or of the rear-view camera 122. The position of the darkened portion 412 can then be determined in such a way that the darkened portion lies in the determined light trajectory, and therefore blanks out the source 401 of glare for the eye 403.

In this context, the source 401 of glare, the glare shield 100 and the eye 403 of the occupant move relative to one another, with the result that the position of the darkened portion 412 typically has to be continuously determined again. In this context, the sources 401 of glare usually move uniformly and without high frequency oscillations in space. The movements of the eyes of the occupant occur owing to active movements of the occupant and/or owing to accelerations/movements of the vehicle (for example caused by unevennesses in the road, cornering, etc.). Movements of the eyes of the occupant which originate from accelerations of the vehicle follow with a delay with respect to corresponding accelerations of the vehicle.

The control unit 130 can be configured to receive data from a gyro/acceleration sensor of the vehicle. For example, a gyro sensor (for example a gyro sensor 123) can be used to sense the movement/acceleration of the vehicle. The acceleration sensor is typically rigidly connected to the vehicle, with the result that accelerations of the vehicle can be sensed without distortion and in close to real time conditions. From the sensed accelerations of the vehicle it is then possible to predict the acceleration of the eyes of the driver. The predicted acceleration of the eyes of the driver can be used to predict the position of the eyes of the driver and to adapt the position of a darkened portion 412 to the predicted position of the eyes of the driver.

Figure 6:
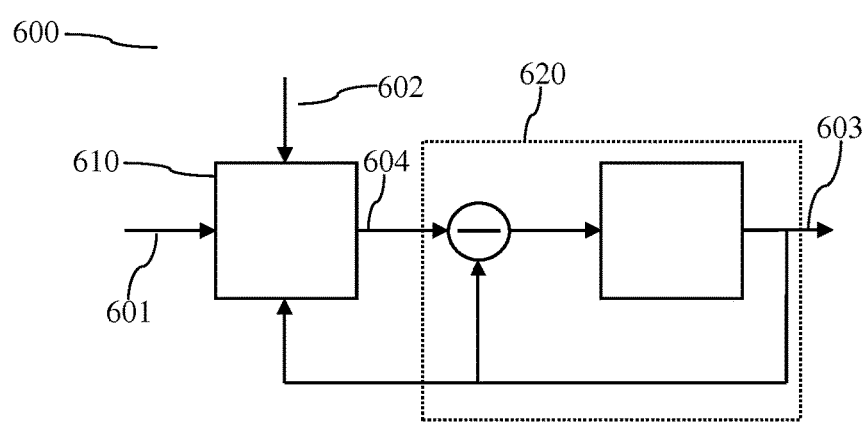
FIG. 6 is a schematic diagram of a block diagram of an exemplary device for determining the position of an eye of a driver.

FIG. 6 shows a block diagram of an exemplary device 600 for determining the chronologically and spatially correct position of the one or more darkened portions 412 on the area 112 which can be darkened, as a function of the current position of the source 401 of glare, of the current position of the eyes 403, 404 and of the current acceleration situation of the vehicle (for example on the basis of unevennesses in the road or cornering). In particular when the device 600 includes a prediction unit 610 which is configured to predict a position of the eye of the occupant on the basis of movement data 601 of the vehicle. The movement data 601 of the vehicle can be made available by a gyro sensor. Image data 602 of the eye of the occupant captured by the rear-view camera 122 and/or the position 603 of the eye of the occupant which was determined last can be taken into account as further input variables for the prediction. A future eye position 604 can be predicted on the basis of this data. The predicted future eye position 604 can then be used in a regulating unit 620 to define the positions of the one or more darkened portions 412 on the area 112 which can be darkened in such a way that these darkened portions 412 are then suitable for the eye position which then actually occurs. In this context, use is made of the fact that the phase of the movement of the eye position "lags" with respect to the exciting oscillation of the vehicle. Then, the delay which typically occurs in the controlled section as a result of signal analysis, computational steps and signal transit times can be at least partially compensated, wherein the control frequency can be reduced with the same quality of control.

In terms of control technology for the system comprising the "excitation of the vehicle including the gyro/acceleration sensor; seat; driver; eyes; darkened portion on the glare shield" a frequency dependent transmission characteristic or transmission function can be analyzed. Therefore, it is possible to implement a control process which can predict the movements of the eyes on the base of the instantaneous acceleration of the vehicle. The transmission function between the captured movement data 601 and the resulting change in the position of the eyes of the driver can be determined in advance. For example the transmission function for the current driver can be determined in a training sequence (for example at the start of a journey) by evaluating the signals 601 of the gyro/acceleration sensor and the detection 602 of the eye position, in order then to adjust the control characteristic thereto. In particular, the transmission function can be used in the prediction unit 610.

Further functions of a glare shield are specified below:

The part 112 which can be darkened can be used in a transparent form to reduce unpleasant reflections in the front windshield 150.

In particular, the part 112 which can be darkened can be configured to polarize incident light. This is illustrated by way of example in FIG. 3. FIG. 3 shows a light beam 301 in the outer region of the vehicle, which light beam is not polarized. Typically partial polarization already occurs in the vertical direction as a result of the front windshield 150 of a vehicle. This leads to a situation in which horizontally polarized light 302 bounces off the front windshield 150 and partially vertically polarized light 303 passes into the interior of the vehicle through the front windshield 150.

The part 112, which can be darkened, of the glare shield 100 can have the same polarization plane as the front windshield 150. As a result, the combined transparency composed of the front windshield 150 and the part 112 which can be darkened can be maximized. In other words, as a result of a matching of the polarization planes of the front windshield 150 and the part 112 which can be darkened it is possible to maximize the energy of the light 304 which reaches the driver. In the event of the layer 112 which can be darkened comprising an LCD layer, and the front windshield being inclined to a relatively large degree (as in customary passenger cars), for example a portion of approximately 60% of the light can pass through the LCD layer, instead of approximately 42% which would occur without the effect of the pre polarization as a result of the front windshield 150. In this context, the 42% results from approximately 50% transmission loss owing to the polarization effect of the LCD layer and additional reflection losses at the boundary faces in front of and behind the LCD layer.

By means of the one or more fixed positions described in this application it is possible to ensure that positions of the glare shield 100 which are incompatible with a crash are possible only transiently. The one or more fixed positions may be a positions of the glare shield 100 which is as safe as possible. As stated above, the folding out angle of the glare shield 100, and therefore the position of the glare shield 100, can be determined by means of a sensor 123.

The area 112 which can be darkened can be darkened in a plurality of stages or, if appropriate, also in an infinitely variable fashion. As a result, various functional modes for the glare shield 100 can be made available. A transparent area 112 can be used to eliminate reflections; an area 112 which is darkened completely over the entire surface can be used to blank out a specific region; the area 112 can be used similarly to a pair of sunglasses by means of adjustable transmission; by means of the darkening of individual points it is possible to blank out sources of glare in a dedicated fashion; and by graduating the transmission it is possible to attenuate parts of the area according to requirements.

By means of the glare shield devices as described in this application it is possible to reduce significantly the dazzling effect of sources of glare on the driver of a vehicle. As a result, the fatigue of the driver can be reduced and the convenience for the driver can be increased. Furthermore, this improves the safety of a vehicle.

The present invention is not restricted to the exemplary embodiments shown. In particular, it is to be borne in mind that the description and the figures are intended only to illustrate the principle of the proposed methods, devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A glare shield device which is configured to selectively and at least partially block light from a source of glare, from reaching an eye of a viewer, the glare shield device comprising:
    at least a first translucent layer having a multiplicity of elements, wherein
        the translucency of the multiplicity of elements are separately changeable,
        the multiplicity of elements each have a different viewing direction range which is limited to at most a given angle, such that a reduction in the translucency of an element is perceived more strongly when viewing with the eye of the viewer from a direction within the viewing direction range than when viewing from a direction outside the viewing direction range,
        the glare shield device is configured to set a first element from a multiplicity of elements of the first translucent layer,
        the first element lies between the source of glare and a first eye of the viewer,
        a light trajectory lies between the source of glare and the first eye of the viewer within viewing direction range of the first element, and
        a light trajectory between the source of glare and a second eye of the viewer lies outside the viewing direction range of the first element.

2. The glare shield device as claimed in claim 1, wherein the glare shield device comprises a second translucent layer having a multiplicity of elements; wherein the glare shield device is configured to select a second element from the multiplicity of elements of the second layer in such a way that
    the second element lies on a light trajectory between the source of glare and the second eye of the viewer,
    the light trajectory between the source of glare and the second eye lies within a viewing direction range of the second element; and
    a light trajectory between the source of glare and the first eye of the viewer lies outside the viewing direction range of the second element.

3. The glare shield device as claimed in claim 2, wherein the viewing direction range has a direction range boundary; and
    the direction range boundaries of the viewing direction ranges of the second layer are mirror-symmetrical with respect to the direction range boundaries of the viewing direction ranges of the first translucent layer.

4. The glare shield device as claimed in claim 3, wherein the viewing direction ranges of the elements of two different layers of the multiplicity of translucent layers are different; and
    the glare shield device is configured to select the first translucent layer as a function of the viewing direction ranges.

5. The glare shield device as claimed in claim 4, wherein the viewing direction ranges of the elements change along a surface axis of the first translucent layer.

6. The glare shield device as claimed in claim 5, wherein elements of the first translucent layer are configured to at least partially block the light from one or more sources of glare from reaching the first eye by reducing the translucency, so that the reduced translucency cannot be perceived substantially by the second eye; and
    one or more layers having elements which are configured to at least partially block the light from the one or more sources of glare from reaching the second eye by reducing the translucency, so that the reduced translucency cannot be perceived substantially by the first eye.

7. The glare shield device as claimed in claim 6, wherein the glare shield device comprises a darkening layer having elements which are configured to at least partially block the light from the one or more sources of glare from reaching the first eye and the second eye by reducing the translucency.

8. The glare shield device as claimed in claim 7, wherein the glare shield device comprises one or more self-illuminating display layers; and
    the glare shield device is configured to display information on the darkening layer by means of the one or more self-illuminating display layers.

9. The glare shield device as claimed in claim 8, wherein the viewing direction ranges of the elements of two different layers of the multiplicity of translucent layers are different.

10. The glare shield device as claimed in claim 9, wherein the glare shield device is configured to select one of the first or second translucent layers as a function of a position of the source of glare, so that the source of glare of a first eye of the viewer is located within the viewing direction range of at least one element of the multiplicity of elements of the first layer, and in this way the source of glare of a second eye of the viewer is located outside the viewing direction range of the at least one element of the multiplicity of elements of the first layer.

11. The glare shield device as claimed in claim 10, wherein the viewing direction ranges of the elements change along a surface axis of the first translucent layer.

12. The glare shield device as claimed in claim 11, wherein
    the viewing direction range has a direction range boundary; and
    the direction range boundaries of the viewing direction ranges of the elements along the surface axis of the first translucent layer are directed onto a common point on a transverse axis perpendicular with respect to the surface axis of the first translucent layer.

13. The glare shield device as claimed in claim 12, wherein the common point corresponds to a center point on an axis between a first eye and a second eye of the viewer.

14. The glare shield device as claimed in claim 13, wherein the glare shield device is configured
    to determine a focal point; and
    to change the direction range boundaries of the viewing direction ranges of the elements along the surface axis of the first translucent layer in such a way that the direction range boundaries are directed onto the focal point.

15. The glare shield device as claimed in claim 14, wherein the glare shield device is configured to regulate the direction range boundaries with respect to a changing focal point by means of a control loop.

16. The glare shield device as claimed in claim 15, wherein the glare shield device is configured
   to determine data relating to an acceleration of a vehicle;
   to predict a position of the eye of the viewer taking into account the data relating to the acceleration of the vehicle;
   to select an element from the multiplicity of elements of the translucent layer, so that the element lies on a light trajectory between the source of glare and the predicted position of the eye of the viewer; and
   to reduce the translucency of the selected element.

17. The glare shield device according to claim 16, wherein the glare shield device is configured to be arranged movably in the passenger compartment of a vehicle, so that the glare shield device is movable into a folded-down position and into a folded-up position, wherein in the folded-down position the glare shield device conceals the view of an occupant of the vehicle of part of a window of the vehicle; wherein the glare shield device comprises
   a carrier part through which a base portion of a glare shield area of the glare shield device is made available; and
   a movable part which is movably arranged in the glare shield device and which is configured to increase the glare shield area of the glare shield device beyond the base portion.

18. The glare shield device as claimed in claim 17, wherein
   the glare shield device comprises a glare shield area;
   the glare shield area has a curvature; and
   in the folded-down position of the glare shield device, the curvature is convex in relation to the window of the vehicle.

19. The glare shield device as claimed in claim 18, wherein the glare shield device comprises,
   a first glare shield area which has a translucent area whose translucency is changeable; and
   a non-transparent glare shield area which is movably arranged and which is configured to at least partially cover the first glare shield area in a first position, and to cover a side window of the vehicle in a second position if the glare shield device is in the folded-down position.

* * * * *